United States Patent
Chen et al.

(10) Patent No.: US 9,554,434 B2
(45) Date of Patent: Jan. 24, 2017

(54) LIGHT EMITTING DIODE DRIVER HAVING A LOGIC UNIT FOR GENERATING A FREQUENCY CONTROL SIGNAL

(71) Applicant: AU Optronics Corp., Hsin-Chu (TW)

(72) Inventors: Kuan-Cheng Chen, Hsin-Chu (TW); Yung-Hsu Lin, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 14/874,477

(22) Filed: Oct. 5, 2015

(65) Prior Publication Data
US 2016/0219663 A1    Jul. 28, 2016

(30) Foreign Application Priority Data
Jan. 28, 2015    (TW) .............................. 104102845 A

(51) Int. Cl.
*H05B 33/08*    (2006.01)
*G09G 3/34*    (2006.01)

(52) U.S. Cl.
CPC ........ *H05B 33/0818* (2013.01); *G09G 3/3406* (2013.01); *H05B 33/0845* (2013.01);
(Continued)

(58) Field of Classification Search
None
See application file for complete search history.

(56) References Cited

U.S. PATENT DOCUMENTS 5,416,397 A  *  5/1995  Mazzara ................. H02P 6/006
                                                    318/135
5,747,977 A      5/1998  Hwang
(Continued)

FOREIGN PATENT DOCUMENTS

CN    103069925 A    4/2013
CN    103280190 A    9/2013
(Continued)

OTHER PUBLICATIONS

AN-6073, FAN6751—Highly Integrated Green-Mode PWM Controller, 2008, Fairchild Semiconductor Corporation, Rev. 1.0.0, Sep. 26, 2008.

*Primary Examiner* — Crystal L Hammond
(74) *Attorney, Agent, or Firm* — McClure, Qualey & Rodack, LLP

(57) ABSTRACT

A light-emitting diode driver includes a power switch, a logic unit and a pulse adjustment signal generator. The power switch is used to control a charging level of a light-emitting diode voltage terminal, and controlled to be turned on or off by a pulse-width modulation signal. The logic unit is coupled to a control terminal of the power switch, and used to generate a frequency control signal. The pulse adjustment signal generator is coupled to the logic unit, and used to generate an operational wave according to the frequency control signal and update the pulse-width modulation signal according to the operational wave. When the duty cycle of the pulse-width modulation signal is smaller than a pulse-width modulation threshold, the operational wave has a first frequency. When the duty cycle of the pulse-width modulation signal is larger than the pulse-width modulation threshold, the operational wave has a second frequency higher than the first frequency.

18 Claims, 18 Drawing Sheets

(52) U.S. Cl.
CPC . *G09G 2320/064* (2013.01); *G09G 2330/021* (2013.01); *G09G 2330/06* (2013.01); *Y02B 20/42* (2013.01)

(56) References Cited

U.S. PATENT DOCUMENTS

| | | | | |
|---|---|---|---|---|
| 7,439,945 B1* | 10/2008 | Awalt | ................ | H05B 33/0818 315/250 |
| 8,294,379 B2* | 10/2012 | Liu | ................ | H05B 33/0809 315/224 |
| 8,344,628 B2* | 1/2013 | Kishimoto | ......... | H05B 41/2985 315/119 |
| 8,416,230 B2* | 4/2013 | Goder | ................ | G09G 3/20 345/212 |
| 8,716,949 B2* | 5/2014 | Watanabe | .......... | H05B 33/0815 315/224 |
| 9,113,521 B2* | 8/2015 | Gredler | .............. | H05B 33/0815 |
| 9,203,424 B1* | 12/2015 | Pastore | ................ | H03M 1/68 |
| 9,276,480 B2* | 3/2016 | Feng | ................ | H02M 3/33507 |
| 2006/0203525 A1* | 9/2006 | Yu | ................ | H02M 7/53871 363/97 |
| 2010/0060181 A1* | 3/2010 | Choi | ................ | H05B 33/0809 315/224 |
| 2011/0140621 A1* | 6/2011 | Yi | ................ | H05B 33/0854 315/224 |
| 2011/0227496 A1* | 9/2011 | Lin | ................ | H05B 33/0818 315/209 R |
| 2011/0285301 A1* | 11/2011 | Kuang | ............... | H05B 33/0845 315/200 R |
| 2012/0019160 A1 | 1/2012 | Lee | | |
| 2012/0112645 A1* | 5/2012 | Lee | ................ | H05B 33/0818 315/186 |
| 2013/0020964 A1* | 1/2013 | Nuhfer | ............... | H05B 33/0815 315/291 |
| 2013/0038227 A1* | 2/2013 | Yan | ................ | H05B 33/0818 315/186 |
| 2013/0083578 A1* | 4/2013 | Kotowski | .......... | H05B 33/0815 363/126 |
| 2013/0099680 A1* | 4/2013 | Chen | ................ | H05B 33/0818 315/185 R |
| 2013/0162701 A1 | 6/2013 | Yang et al. | | |
| 2013/0193879 A1* | 8/2013 | Sadwick | ........... | H05B 33/0818 315/307 |
| 2013/0250215 A1 | 9/2013 | Sasaki et al. | | |
| 2013/0271012 A1* | 10/2013 | Wu | ................ | H05B 33/0845 315/158 |
| 2014/0340000 A1 | 11/2014 | Zhang et al. | | |
| 2015/0076999 A1* | 3/2015 | Malinin | ............. | H05B 33/0815 315/186 |
| 2015/0303898 A1* | 10/2015 | Zhai | ................ | H03K 7/08 327/109 |
| 2015/0333764 A1* | 11/2015 | Pastore | ................ | H03M 1/68 363/21.12 |
| 2016/0088694 A1 | 3/2016 | Sasaki et al. | | |

FOREIGN PATENT DOCUMENTS

| | | |
|---|---|---|
| TW | 201206246 A1 | 2/2012 |
| TW | 201208463 A1 | 2/2012 |

* cited by examiner

LIGHT EMITTING DIODE DRIVER HAVING A LOGIC UNIT FOR GENERATING A FREQUENCY CONTROL SIGNAL

CROSS REFERENCE TO RELATED APPLICATION

This application claims priority to Taiwan Patent Application No. 104102845, filed Jan. 28, 2015, and incorporated herein by reference in its entirety.

BACKGROUND OF THE INVENTION

1. Field of the Invention

The present invention relates to a light-emitting diode driver, and more particularly, a light-emitting diode driver having a logic unit for generating a frequency control signal.

2. Description of the Prior Art

When adjusting backlight brightness of a liquid crystal display of the prior art, a user instruction, an image data and ambient light are analyzed to generate a brightness signal, and the brightness signal is sent to a light-emitting display (LED) driver for adjusting the backlight. Techniques such as Sunlight Readability Enhancement (SRE) may be used for analyzing ambient light to increase the display brightness when detecting brighter ambient light. Techniques such as Content Adaptive Brightness Control (CABC) may be used for analyzing an image data for optimizing the display brightness and contrast according to the displayed image. Either a pulse-frequency modulation (PFM) technique or a pulse-width modulation (PWM) technique may be adopted for controlling the display brightness. When using the pulse-frequency modulation technique, a duty cycle of a control signal controlling a switch of the light-emitting display driver is fixed, and a frequency of the control signal is adjustable. When using the pulse-width modulation technique, the duty cycle of the control signal is adjustable, and the frequency of the control signal is fixed. The pulse-frequency modulation technique usually leads to lower efficiency when driving a heavy load, poor performance of noise reduction and median level of output ripples, and merely has an advantage of good efficiency when driving a light load. The pulse-width modulation technique usually leads to good efficiency for driving a heavy load, ideal performance of noise reduction and output ripples being small enough, but the pulse-width modulation technique has poor efficiency for driving a light load. Hence, a solution for a light-emitting display driver to have good performance of driving a heavy load and a light load, reduce noise greatly and output small ripples is required in the field.

SUMMARY OF THE INVENTION

An embodiment of the present invention discloses a light-emitting diode driver including a power switch, a logic unit and a pulse adjustment signal generator. The power switch is configured to control a charging level of a light-emitting diode voltage terminal, and controlled to be turned on or turned off by a pulse-width modulation signal. The logic unit is coupled to a control terminal of the power switch, and configured to generate a frequency control signal according to a duty cycle of the pulse-width modulation signal. The pulse adjustment signal generator is coupled to the logic unit, and configured to generate an operational wave according to the frequency control signal and update the pulse-width modulation signal according to the operational wave. The operational wave has a first frequency when the duty cycle of the pulse-width modulation signal is lower than a pulse-width modulation threshold, the operational wave has a second frequency when the duty cycle of the pulse-width modulation signal is not lower than a pulse-width modulation threshold, and the first frequency is lower than the second frequency.

Another embodiment of the present invention discloses a light-emitting diode driver including a power switch, a logic unit and a pulse adjustment signal generator. The power switch is configured to control a charging level of a light-emitting diode voltage terminal, and controlled to be turned on or turned off by a pulse-width modulation signal. The logic unit is configured to generate a frequency control signal according to a brightness signal. The pulse adjustment signal generator is coupled to the logic unit, and configured to generate an operational wave according to the frequency control signal and update the pulse-width modulation signal according to the operational wave. The operational wave has a first frequency when a loading value corresponding to the brightness signal is lower than a brightness threshold, the operational wave has a second frequency when the loading value corresponding to the brightness signal is not lower than the brightness threshold, and the first frequency is lower than the second frequency.

An additional embodiment of the present invention discloses a light-emitting diode driver including a power switch, a logic unit and a pulse adjustment signal generator. The power switch is configured to control a charging level of a light-emitting diode voltage terminal, and controlled to be turned on or turned off by a pulse-width modulation signal. The logic unit is coupled to a control terminal of the power switch, and configured to generate a frequency control signal according to a duty cycle of the pulse-width modulation signal and a brightness signal. The pulse adjustment signal generator is coupled to the logic unit, and configured to generate an operational wave according to the frequency control signal and update the pulse-width modulation signal according to the operational wave. The operational wave has a first frequency when the duty cycle of the pulse-width modulation signal is lower than a pulse-width modulation threshold, the operational wave has a second frequency when the duty cycle of the pulse-width modulation signal is not lower than a pulse-width modulation threshold, and the first frequency is lower than the second frequency.

An additional embodiment of the present invention discloses a method for controlling a light-emitting diode driver. The light-emitting diode driver includes a logic unit and a pulse adjustment signal generator. The method includes the pulse adjustment signal generator outputting a pulse-width modulation signal so as to control a power switch, the logic unit generating a frequency control signal according to a duty cycle of the pulse-width modulation signal, the pulse adjustment signal generator receiving the frequency control signal, an oscillator of the pulse adjustment signal generator outputting an operational wave according to the frequency control signal, and the pulse adjustment signal generator updating the pulse-width modulation signal according to the operational wave.

Another embodiment of the present invention discloses a method for controlling a light-emitting diode driver. The light-emitting diode driver includes a logic unit and a pulse adjustment signal generator. The method includes the pulse adjustment signal generator outputting a pulse-width modulation signal to control a power switch, the logic unit generating a frequency control signal according to a duty cycle of the pulse-width modulation signal and a brightness signal, the pulse adjustment signal generator receiving the frequency control signal, an oscillator of the pulse adjustment signal generator outputting an operational wave according to the frequency control signal, and the pulse adjustment signal generator updating the pulse-width modulation signal according to the operational wave.

An additional embodiment of the present invention discloses a method for controlling a light-emitting diode driver. The light-emitting diode driver includes a logic unit and a pulse adjustment signal generator. The method includes the pulse adjustment signal generator outputting a pulse-width modulation signal to control a power switch, the logic unit generating a frequency control signal according to a brightness signal, the pulse adjustment signal generator receiving the frequency control signal, an oscillator of the pulse adjustment signal generator outputting an operational wave according to the frequency control signal, and the pulse adjustment signal generator updating the pulse-width modulation signal according to the operational wave.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
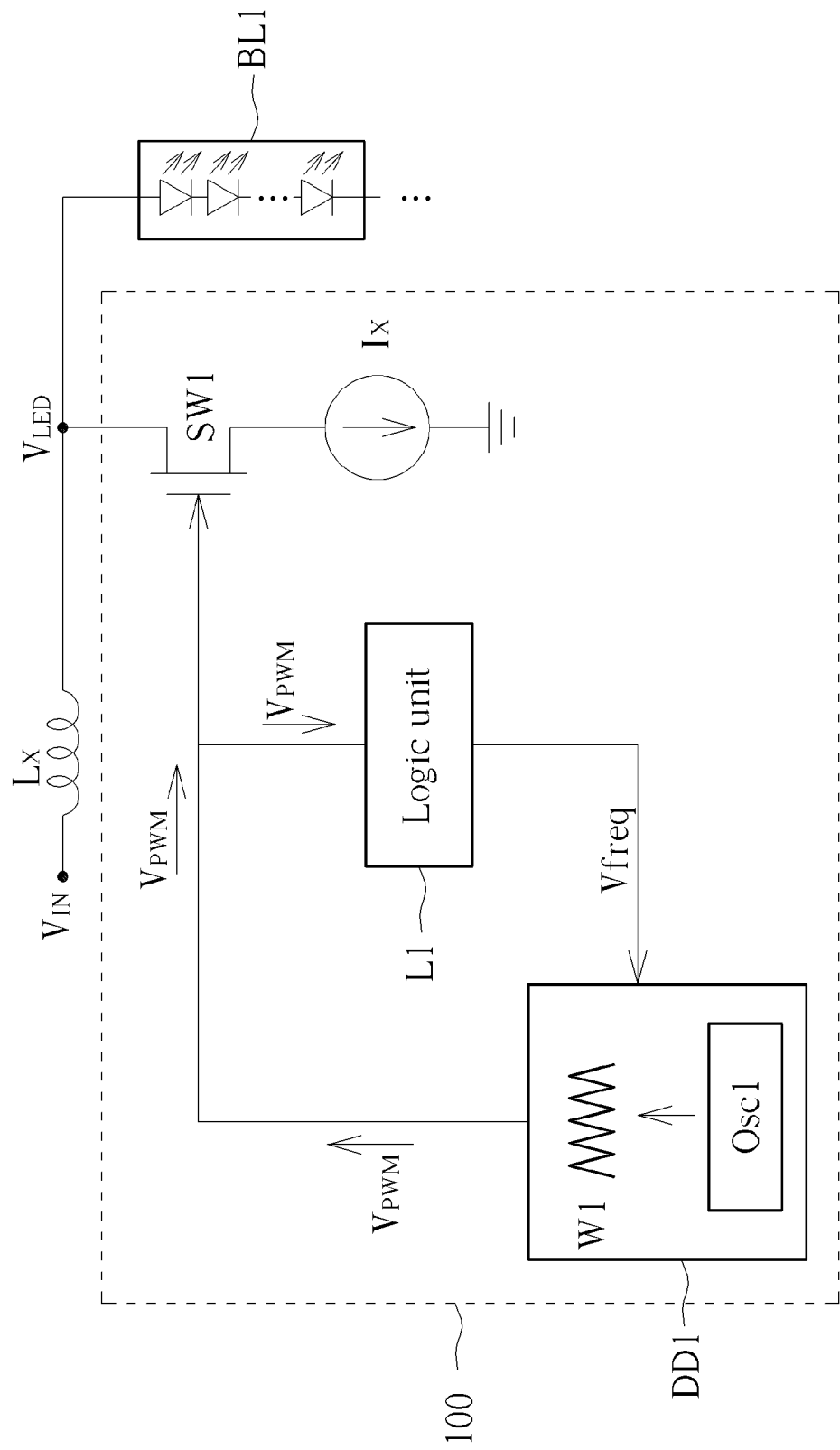
FIG. 1 illustrates a light-emitting diode driver, an inductor and a light-emitting diode unit according to an embodiment of the present invention.

FIG. 1 illustrates a light-emitting diode driver 100, an inductor Lx and a light-emitting diode unit BL1 according to an embodiment of the present invention. The inductor Lx is coupled between an input voltage $V_{IN}$ and a light-emitting diode voltage terminal $V_{LED}$. The light-emitting diode driver 100 includes a power switch SW1, a logic unit L1 and a pulse adjustment signal generator DD1. The light-emitting diode driver 100 is used for controlling display brightness of the light-emitting diode unit BL1. The power switch SW1 is configured to control a charging level of a light-emitting diode voltage terminal $V_{LED}$, and is controlled to be turned on or turned off by a pulse-width modulation signal $V_{PWM}$. The power switch SW1 may be connected to a current source Ix. The logic unit L1 is coupled to a control terminal of the power switch SW1, and configured to generate a frequency control signal Vfreq according to a duty cycle of the pulse-width modulation signal $V_{PWM}$. The pulse adjustment signal generator DD1 is coupled to the logic unit L1, and configured to generate an operational wave W1 according to the frequency control signal Vfreq and update the pulse-width modulation signal $V_{PWM}$ according to the operational wave W1. The operational wave W1 has a first frequency when the duty cycle of the pulse-width modulation signal $V_{PWM}$ is lower than a pulse-width modulation threshold. The operational wave W1 has a second frequency when the duty cycle of the pulse-width modulation signal $V_{PWM}$ is not lower than the pulse-width modulation threshold, and the first frequency is lower than the second frequency. In one embodiment of the present invention, the input voltage $V_{IN}$ may be (but not limited to) a 4.5 volt power provided by a battery or a 21 volt power provided by a power transformer. The inductor Lx is used for storing energy, and its inductance can be designed as an appropriate value according to requirement. The inductor Lx may be (but not limited to) a 4.7 micro henry (uH) inductor or a 10 uH inductor.

Figure 2:
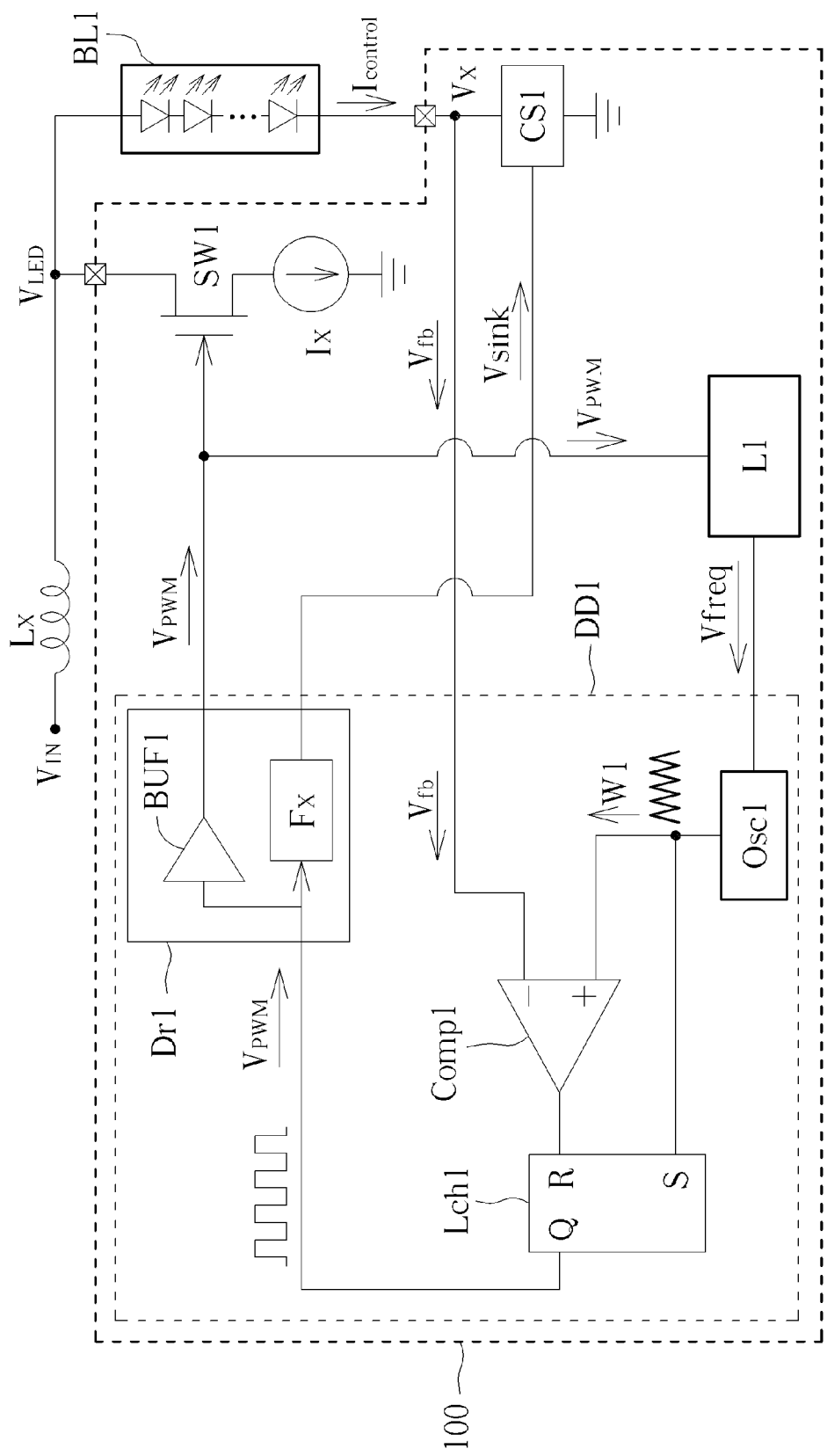
FIG. 2 illustrates the inductor, the light-emitting diode unit and an internal block diagram of the light-emitting diode driver shown in FIG. 1.

FIG. 2 illustrates an internal block diagram of the light-emitting diode unit BL1, the inductor Lx and the light-emitting diode driver 100 shown in FIG. 1. The inductor Lx is coupled between the input voltage $V_{IN}$ and the light-emitting diode voltage terminal $V_{LED}$. As illustrated in FIG. 2, the pulse adjustment signal generator DD1 includes an oscillator Osc1, a comparator Comp1, a latch Lch1 and a driving unit Dr1. The oscillator Osc1 is configured to output the operational wave W1 according to the frequency control signal Vfreq. The comparator Comp1 is coupled to the oscillator Osc1 and configured to generate the pulse-width modulation signal $V_{PWM}$ according to the operational wave W1 and a feedback signal $V_{fb}$. The latch Lch1 is coupled to the oscillator Osc1 and the comparator Comp1, and configured to control whether pulse-width modulation signal $V_{PWM}$ is output or not according to the operational wave W1. The driving unit Dr1 is coupled to the latch Lch1, and configured to output the pulse-width modulation signal $V_{PWM}$ to the power switch SW1. For example, the oscillator Osc1 may set the frequency of the operational wave W1 as 1.2 mega-hertz (MHz), 600 kilo-hertz (KHz) or 450 KHz according to the frequency control signal Vfreq so as to make the pulse-width modulation signal $V_{PWM}$ have a frequency of 1.2 MHz, 600 KHz or 450 KHz correspondingly. The comparator Comp1 may set the duty cycle of the pulse-width modulation signal $V_{PWM}$ to be several different values such as 85%, 80% or 25% according to the operational wave W1 and the feedback signal $V_{fb}$. The mentioned values of frequency of the operational wave W1 and the duty cycle of the pulse-width modulation signal $V_{PWM}$ are merely taken as examples instead of being used to limit the scope of the present invention. The duty cycle of the pulse-width modulation signal $V_{PWM}$ may correspond to the input voltage. For example, when the duty cycle of the pulse-width modulation signal $V_{PWM}$ is 85% (being larger than 50%), the duty cycle may correspond to a 4.5 volt input voltage (provided by a battery); and when the duty cycle of the pulse-width modulation signal $V_{PWM}$ is 33% (being not larger than 50%), the duty cycle may correspond to a 21 volt input voltage (provided by a transformer).

As shown in FIG. 2, the driving unit Dr1 includes a buffer BUF1 and a processing unit Fx. The buffer BUF1 may receive the pulse-width modulation signal $V_{PWM}$ and send the pulse-width modulation signal $V_{PWM}$ to the control terminal of the power switch SW1. The processing unit Fx may generate a control signal Vsink according to the pulse-width modulation signal $V_{PWM}$. The driving unit Dr1 may include a current sink CS1, and the control signal Vsink may be a current sinking signal. The current sink CS1 may have an operational voltage Vx. The current sink CS1 may generate an adjustment signal Icontrol according to the control signal Vsink to control display brightness of the light-emitting diode unit BL1 of a backlight panel. The current sink CS1 may also generate the feedback signal $V_{fb}$ according to the operational voltage Vx. In FIG. 2, the feedback signal $V_{fb}$ and the operational voltage Vx are sampled from a same node, however, in some implementations of the present invention, the feedback signal $V_{fb}$ may be obtained by processing the operational voltage Vx. The light-emitting diode unit BL1 may be (but not limited to) a series of light-emitting diodes, and the said adjustment signal Icontrol may be a current flowing through the light-emitting diode unit BL1. In this case, the higher the current is, the higher the display brightness will be. Hence, the adjustment signal Icontrol may be used for adjusting the display brightness.

Figure 3:
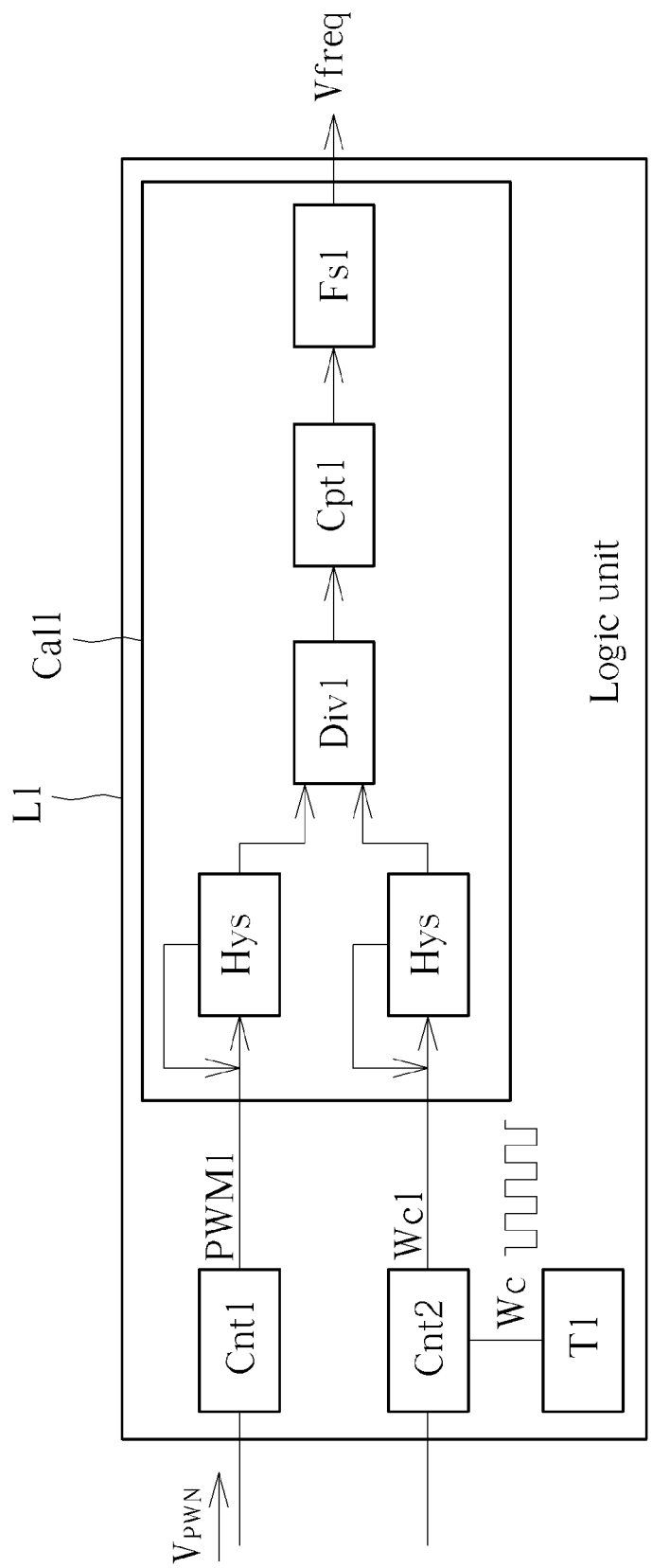
FIG. 3 illustrates an internal design of the logic unit shown in FIGS. 1 and 2.

FIG. 3 illustrates an internal design of the logic unit L1 shown in FIGS. 1 and 2. The logic unit L1 includes a clock generator T1, a pulse-width modulation counter Cnt1, a counting wave counter Cnt2 and a calculation unit Cal1. The clock generator T1 is configured to generate a counting wave Wc. The pulse-width modulation counter Cnt1 may be used for counting pulses of the pulse-width modulation signal $V_{PWM}$ for generating a pulse-width modulation count value PWM1. The counting wave counter Cnt2 may be used for counting pulses of the counting wave Wc for generating a counting wave count value Wc1. The calculation unit Cal1 is used for generating the frequency control signal Vfreq according to the counting wave count value Wc1 and the pulse-width modulation count value PWM1. The said counting wave Wc may be a wave with a fixed frequency. The calculation unit Cal1 may have at least one hysteresis unit Hys, a divider unit Div1, a comparator Cpt1 and a frequency setting unit Fs1. The hysteresis unit Hys may eliminate noise. The divider unit Div1 may perform division calculation with the pulse-width modulation count value PWM1 and the counting wave count value Wc1. The comparator unit Cpt1 may confirm a result of the calculation performed by the divider unit Div1. The frequency setting unit Fs1 may generate the frequency control signal Vfreq according to a result generated by the comparator unit Cpt1. The frequency setting unit Fs1 may have a lookup table or a dedicated program for generating the frequency control signal Vfreq according to the result of comparison of the comparator unit Cpt1. The internal block diagram illustrated in FIG. 3 is taken for example for describing one implementation of the logic unit L1 generating the frequency control signal Vfreq according to the pulse-width modulation signal $V_{PWM}$ instead of limiting the internal instruction of the logic unit L1.

Figure 4:
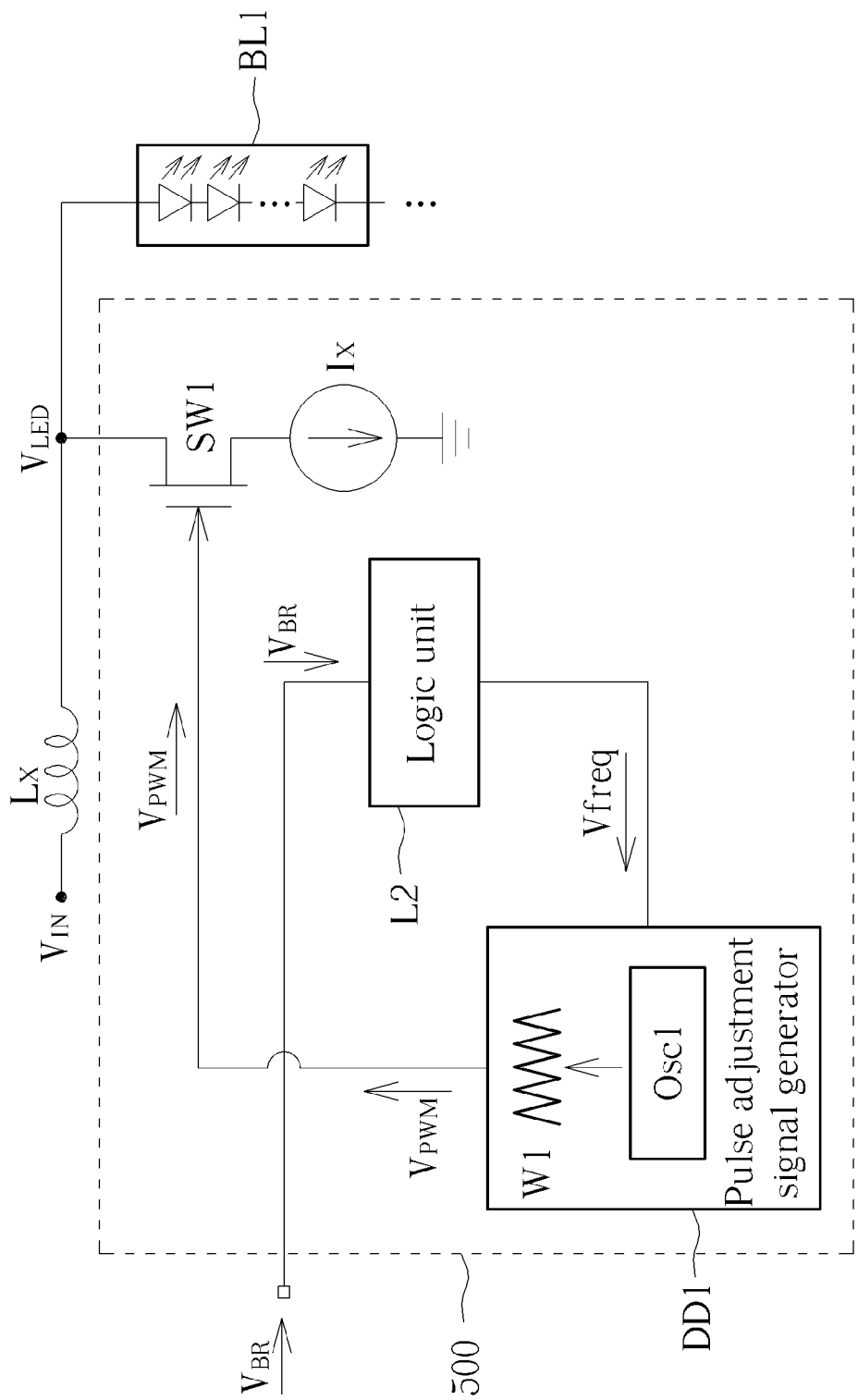
FIG. 4 illustrates a light-emitting diode driver, the inductor and the light-emitting diode according to another embodiment of the present invention.

FIG. 4 illustrates a light-emitting diode driver 500, the inductor Lx and the light-emitting diode BL1 according to another embodiment of the present invention. The inductor Lx is coupled to the input voltage $V_{IN}$. The light-emitting diode driver 500 includes the power switch SW1, a logic unit L2 and the pulse adjustment signal generator DD1. The power switch SW1 may be used for controlling a charging level of the light-emitting diode voltage terminal $V_{LED}$, be turned on or turned off by a pulse-width modulation signal $V_{PWM}$, and be coupled to the current source Ix. The logic unit L2 may generate the frequency control signal Vfreq according to a brightness signal $V_{BR}$. The pulse adjustment signal generator DD1 is coupled to the logic unit L2, and used to generate the operational wave W1 according to the frequency control signal Vfreq and update the pulse-width modulation signal $V_{PWM}$ according to the operational wave W1. The operational wave W1 has a third frequency when a loading value corresponding to the brightness signal $V_{BR}$ is lower than a brightness threshold, the operational wave W1 has a fourth frequency when the loading value corresponding to the brightness signal $V_{BR}$ is not lower than the brightness threshold, and the third frequency may be lower than the fourth frequency. In one embodiment of the present invention, the input voltage $V_{IN}$ may be (but not limited to) a 4.5 volt power provided by a battery or a 21 volt power provided by a power transformer. The inductor Lx is used for storing energy, and its inductance can be designed as an appropriate value according to requirement. The inductor Lx may be (but not limited to) a 4.7 uH inductor or a 10 uH inductor.

Figure 5:
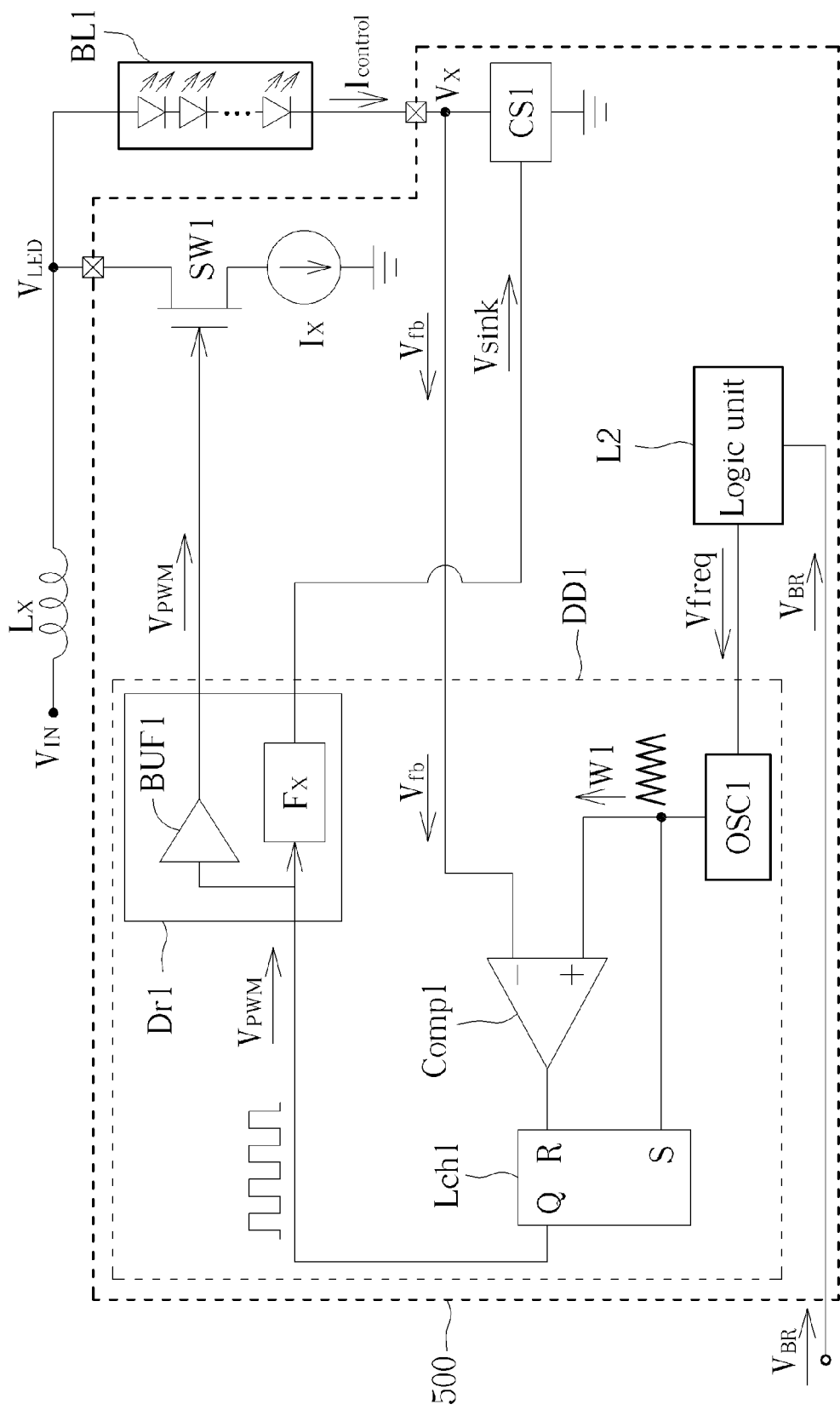
FIG. 5 illustrates the inductor, the light-emitting diode unit and an internal block diagram of the light-emitting diode driver shown in FIG. 4.

FIG. 5 illustrates the inductor Lx, the light-emitting diode unit BL1 and an internal block diagram of the light-emitting diode driver 500 shown in FIG. 4. The operating principles of the pulse adjustment signal generator DD1, the oscillator Osc1, the comparator Comp1, the latch Lch1 and the driving unit Dr1 are similar to what is described for FIG. 2, so are not repeated. The logic unit L2 (shown in FIG. 5) is different from the logic unit L1 (shown in FIG. 2) in that the logic unit L2 generates the frequency control signal Vfreq according to the brightness signal $V_{BR}$ instead of the duty cycle of the pulse-width modulation signal $V_{PWM}$.

Figure 6:
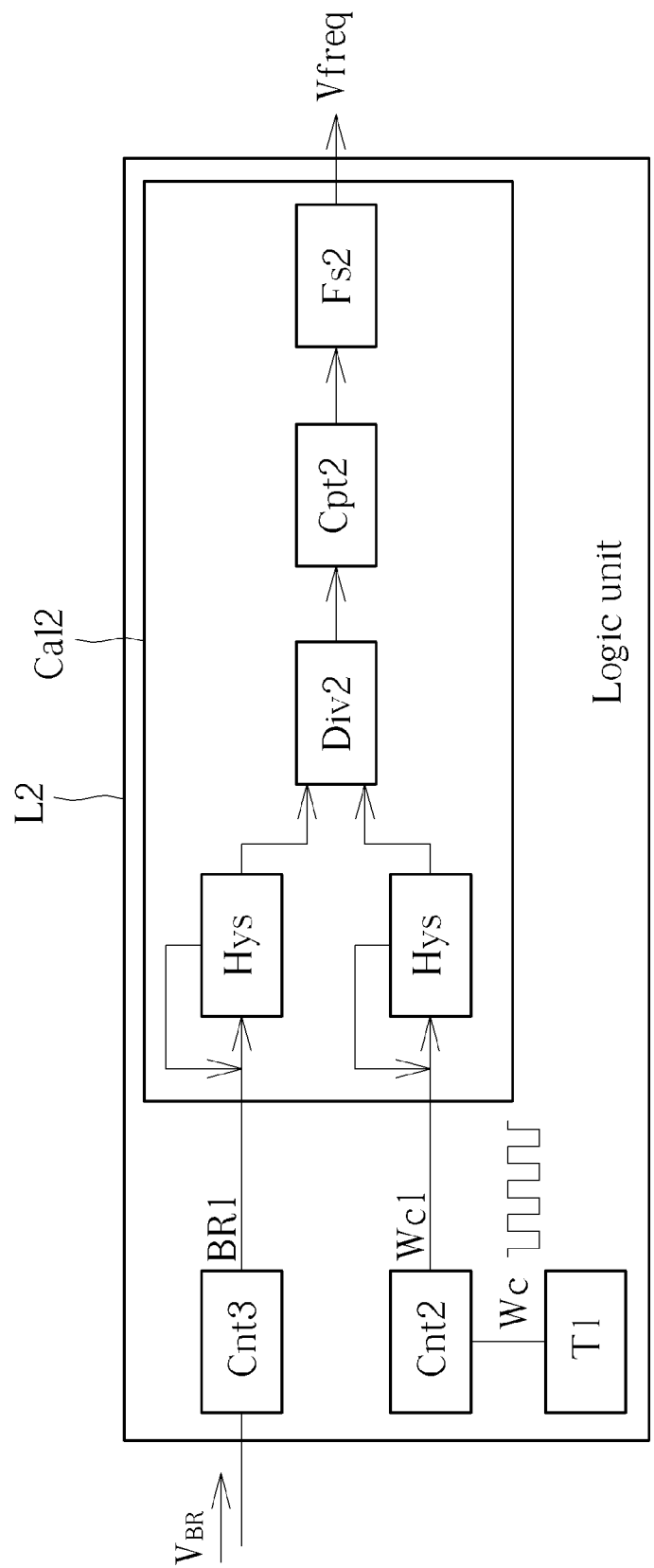
FIG. 6 illustrates an internal design of the logic unit shown in FIGS. 4 and 5.

FIG. 6 illustrates an internal design of the logic unit L2 shown in FIGS. 4 and 5. The logic unit L2 includes a clock generator T1, a brightness signal counter Cnt2, a counting wave counter Cnt2 and a calculation unit Cal2. The clock generator T1 is configured to generate the counting wave Wc. The brightness counter Cnt3 may be used for counting pulses of the brightness signal $V_{BR}$ for generating a brightness count value BR1. The counting wave counter Cnt2 may be used for counting pulses of the counting wave Wc for generating a counting wave count value Wc1. The calculation unit Cal2 is used for generating the frequency control signal Vfreq according to the counting wave count value Wc1 and the brightness count value BR1. The said counting wave Wc may be a wave with a fixed frequency. The calculation unit Cal2 may have at least one hysteresis unit Hys, a divider unit Div2, a comparator Cpt2 and a frequency setting unit Fs2. The hysteresis unit Hys may eliminate noise. The divider unit Div2 may perform division calculation with the brightness count value BR1 and the counting wave count value Wc1. The comparator unit Cpt2 may check a result of the calculation performed by the divider unit Div2. The frequency setting unit Fs2 may generate the frequency control signal Vfreq according to a result generated by the comparator unit Cpt2. The frequency setting unit Fs2 may have a predetermined lookup table or a dedicated program for generating the frequency control signal Vfreq according to the result of comparison of the comparator unit Cpt2. The internal block diagram illustrated in FIG. 6 is taken for example for describing one implementation of the logic unit L2 generating the frequency control signal Vfreq according to the brightness signal $V_{BR}$ instead of limiting the internal instruction of the logic unit L2.

Figure 7:
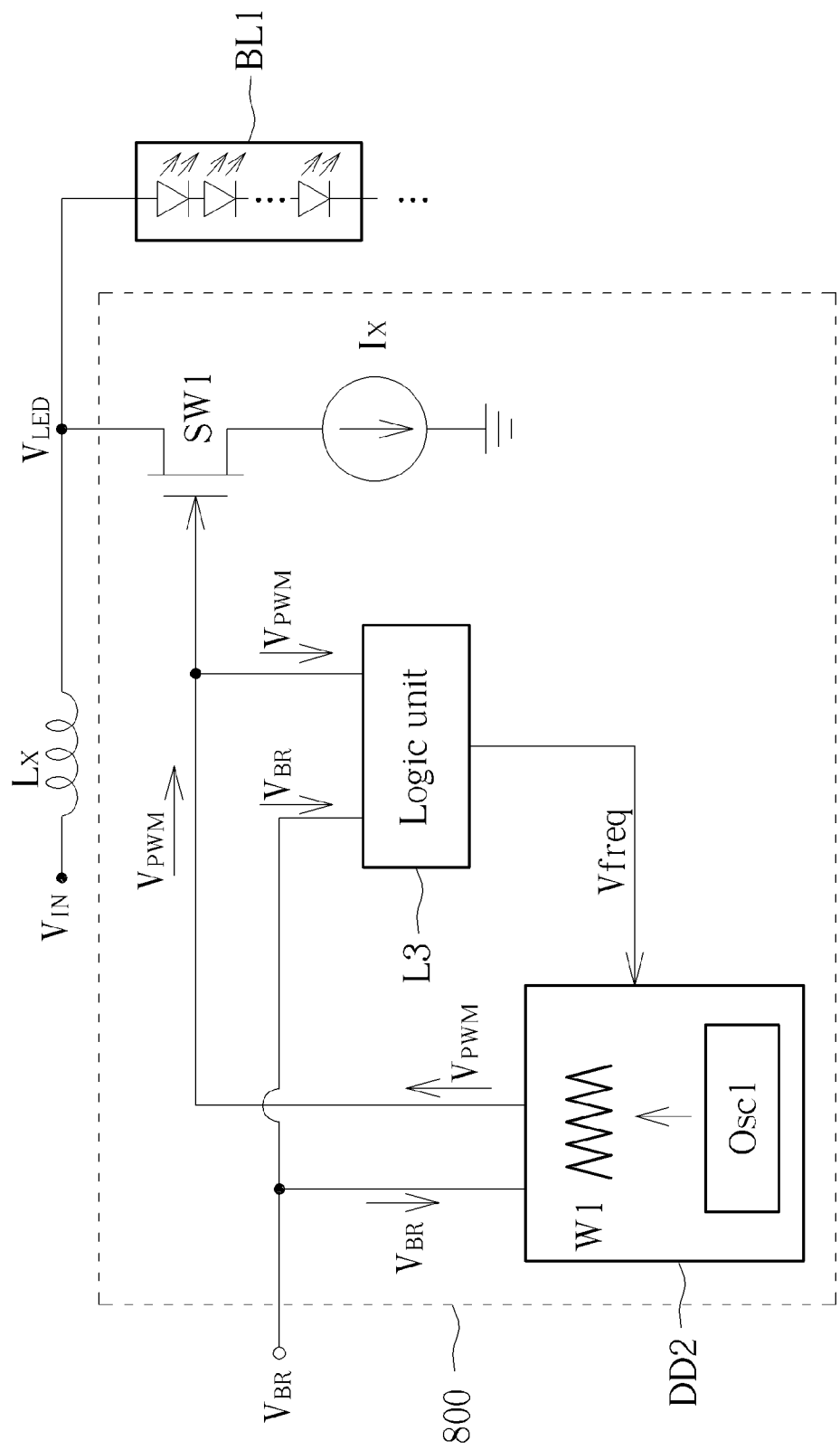
FIG. 7 illustrates a light-emitting diode driver, the inductor and the light-emitting diode according to yet another embodiment of the present invention.

FIG. 7 illustrates a light-emitting diode driver 800, the inductor Lx and the light-emitting diode BL1 according to yet another embodiment of the present invention. The inductor Lx is coupled to the input voltage $V_{IN}$ and the light-emitting diode voltage terminal $V_{LED}$. The light-emitting diode driver 800 includes the power switch SW1, a logic unit L3 and a pulse adjustment signal generator DD2. The power switch SW1 may be used for controlling a charging level of the light-emitting diode voltage terminal $V_{LED}$ to be turned on or turned off by a pulse-width modulation signal $V_{PWM}$, and be coupled to the current source Ix. The logic unit L3 may be connected to the control terminal of the power switch SW1, and generate the frequency control signal Vfreq according to the brightness signal $V_{BR}$ and the duty cycle of the pulse-width modulation signal $V_{PWM}$. The pulse adjustment signal generator DD2 may be coupled to the logic unit L3 and the brightness signal $V_{BR}$, and used to generate the operational wave W1 according to the frequency control signal Vfreq and update the pulse-width modulation signal $V_{PWM}$ according to the operational wave W1. The operational wave W1 has the first frequency when the duty cycle of the pulse-width modulation signal $V_{PWM}$ is lower than a pulse-width modulation threshold. The operational wave W1 has the second frequency when the duty cycle of the pulse-width modulation signal $V_{PWM}$ is not lower than the pulse-width modulation threshold, and the first frequency is lower than the second frequency. In one embodiment of the present invention, the input voltage $V_{IN}$ may be (but not limited to) a 4.5 volt power provided by a battery or a 21 volt power provided by a power transformer. The inductor Lx is used for storing energy, and its inductance can be designed as an appropriate value according to requirement. The inductor Lx may be (but not limited to) a 4.7 uH inductor or a 10 uH inductor.

Figure 8:
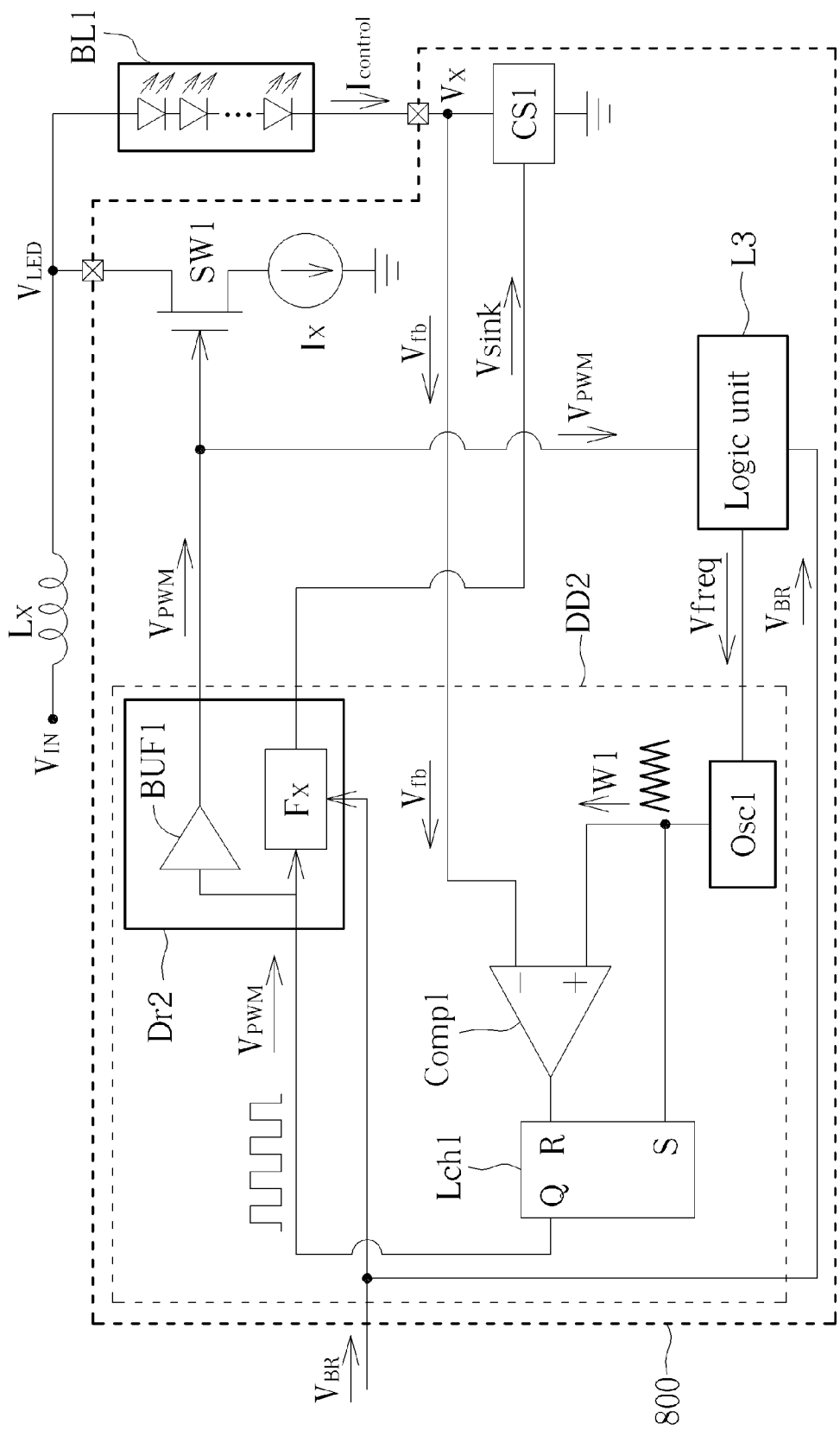
FIG. 8 illustrates the inductor, the light-emitting diode unit and an internal block diagram of the light-emitting diode driver shown in FIG. 7.

FIG. 8 illustrates the inductor Lx, the light-emitting diode unit BL1 and an internal block diagram of the light-emitting diode driver 800 shown in FIG. 7. The operating principles of the pulse adjustment signal generator DD2, the oscillator Osc1, the comparator Comp1 and the latch Lch1 are similar to what is described for FIG. 2, so are not repeated. The driving unit Dr2 includes a processing unit Fx2, and the processing unit Fx2 may generate the control signal Vsink according to the pulse-width modulation signal $V_{PWM}$ and the brightness signal $V_{BR}$. The logic unit L3 (shown in FIG. 8) is different from the logic unit L1 (shown in FIG. 2) in that the logic unit L3 generates the frequency control signal Vfreq according to both the duty cycle of the pulse-width modulation signal $V_{PWM}$ and the brightness signal $V_{BR}$ rather than only the duty cycle of the pulse-width modulation signal $V_{PWM}$.

Figure 9:
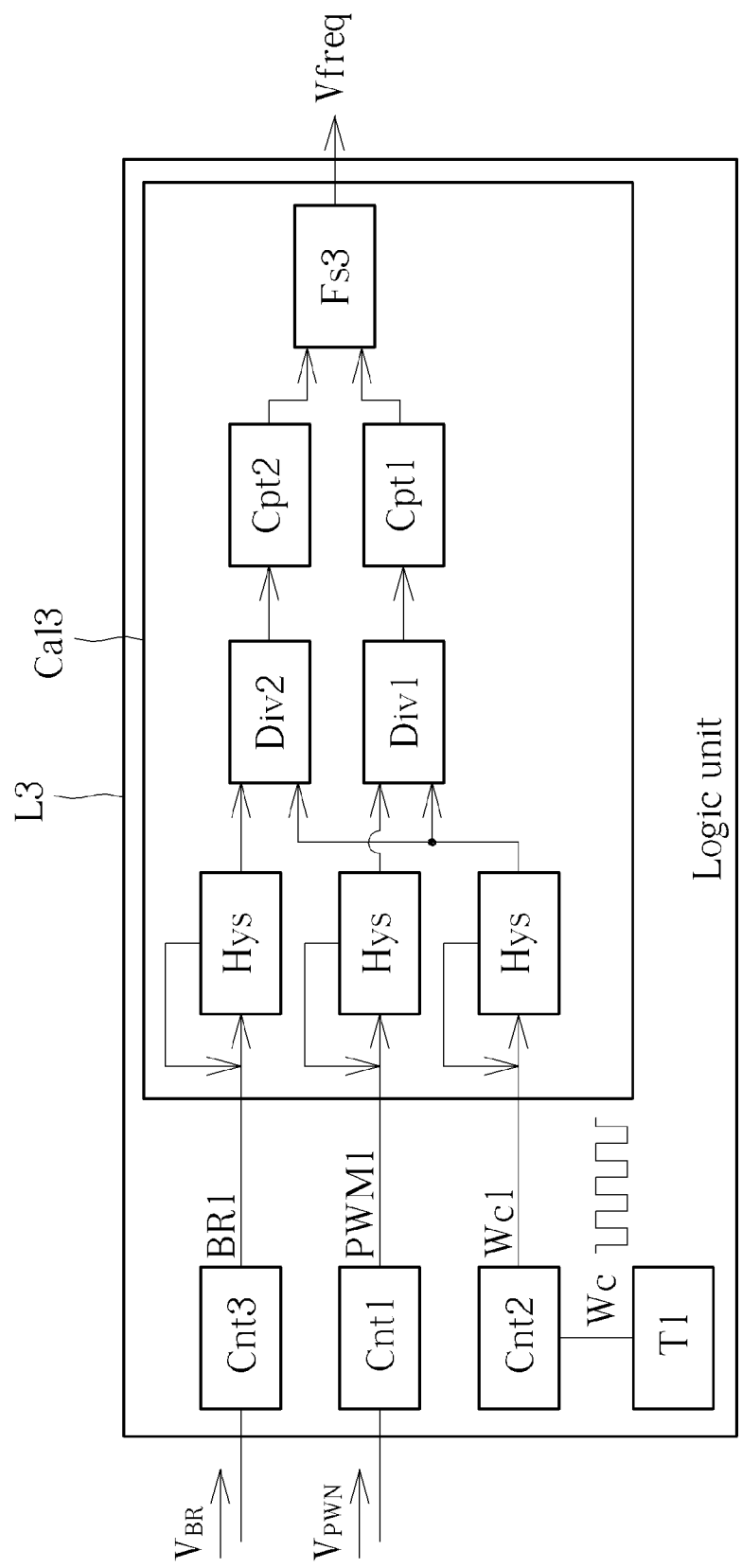
FIG. 9 illustrates an internal design of the logic unit shown in FIGS. 7 and 8.

FIG. 9 illustrates an internal design of the logic unit L3 shown in FIGS. 7 and 8. The logic unit L3 includes the clock generator T1, a pulse-width modulation counter Cnt1, a counting wave counter Cnt2, a brightness signal counter Cnt3 and a calculation unit Cal3. The calculation unit Cal3 may have at least one hysteresis unit Hys, a divider unit Div1, another divider Div2, a comparator Cpt1, another comparator Cpt2 and a frequency setting unit Fs3. The operating principles of the pulse-width modulation counter Cnt1, the counting wave counter Cnt2, the brightness signal counter Cnt3, the hysteresis unit Hys, the divider unit Div1, the divider Div2, the comparator Cpt1, and the comparator Cpt2 are similar to what is described above, so are not repeated. The frequency setting unit Fs3 may generate the frequency control signal Vfreq according to results generated by the comparator units Cpt1 and Cpt2. The frequency setting unit Fs3 may have a lookup table or a dedicated program for generating the frequency control signal Vfreq according to the results of comparison. The internal block diagram illustrated in FIG. 9 is taken for example for describing one implementation of the logic unit L3 generating the frequency control signal Vfreq according to the duty cycle of the pulse-width modulation signal $V_{PWM}$ and the brightness signal $V_{BR}$ instead of limiting the internal instruction of the logic unit L3.

Figure 10:
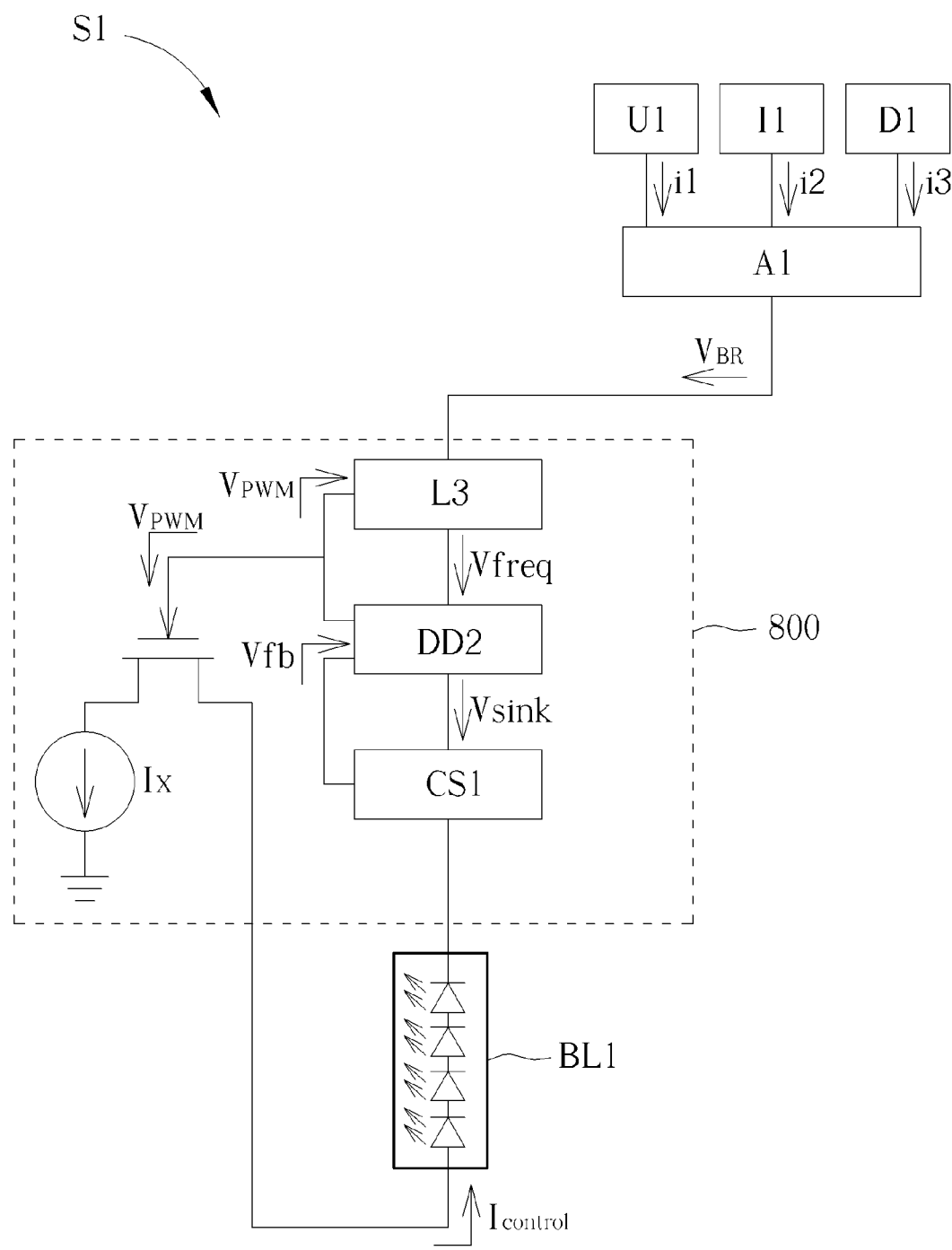
FIG. 10 illustrates a system including the light-emitting diode driver shown in FIGS. 7 and 8.

FIG. 10 illustrates a system S1 including the light-emitting diode driver 800 shown in FIGS. 7 and 8. The system S1 includes a user instruction receiving unit U1, an image data unit I1, an ambient light detector D1, an analysis unit A1, the light-emitting driver 800 and a light-emitting diode unit BL1. The user instruction receiving unit U1 may receive a user instruction and generate a user instruction signal i1 accordingly. The image data unit I1 may generate an image data signal i2 according to an image data being displayed. The ambient light detector D1 may detect the ambient light and generate an ambient light signal i3 accordingly. The analysis unit A1 may analyze the user instruction signal i1, the image data signal i2 and the ambient light signal i3, generate the brightness signal $V_{BR}$ accordingly, and send the brightness signal $V_{BR}$ to the light-emitting diode driver 800. The light-emitting diode driver 800 includes the logic unit L3, the pulse adjustment signal generator DD2, the current sink CS1 and the power switch SW1. The logic unit L3 may generate the frequency control signal Vfreq according to the duty cycle of the pulse-width modulation signal $V_{PWM}$ and the brightness signal $V_{BR}$. The pulse adjustment signal generator DD2 may determine the duty cycle of the pulse-width modulation signal $V_{PWM}$ according to the feedback signal Vfb, and determine the frequency of the pulse-width modulation signal $V_{PWM}$ according to the frequency control signal Vfreq. The current sink CS1 may generate the adjustment signal Icontrol according to the control signal Vsink in order to control display brightness of the light-emitting diode unit BL1 of a backlight panel. The current sink CS1 may also generate the feedback signal Vfb according to the operational voltage Vx and send the feedback signal Vfb to the pulse adjustment signal generator DD2.

Figure 11:
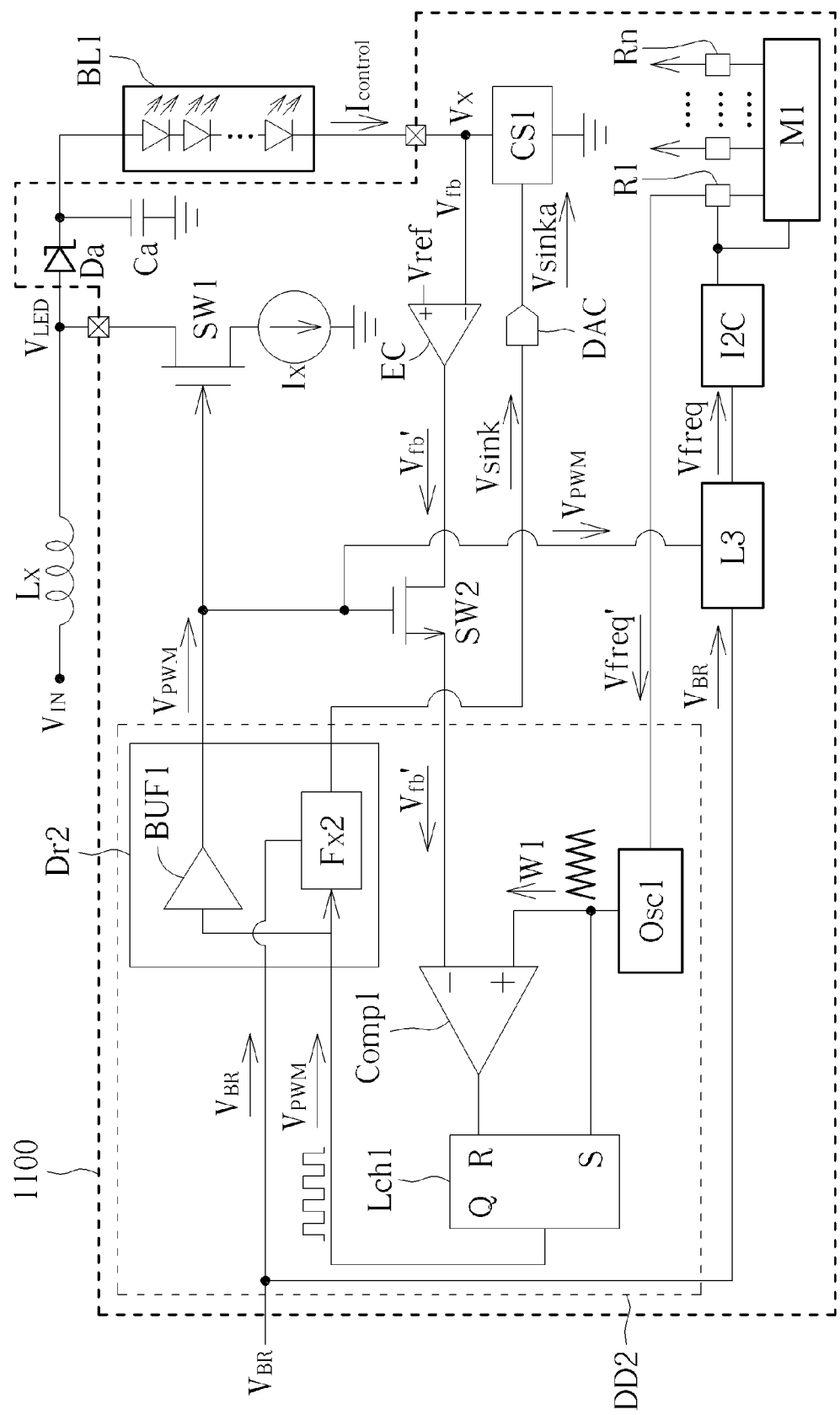
FIG. 11 illustrates the light-emitting diode unit, the inductor and a light-emitting diode driver according to another embodiment of the present invention.

FIG. 11 illustrates the light-emitting diode unit BL1, the inductor Lx and a light-emitting diode driver 1100 according to another embodiment of the present invention. The inductor Lx is coupled to the input voltage $V_{IN}$ and the light-emitting diode voltage terminal $V_{LED}$. The operating principle of the light-emitting diode driver 1100 is similar to the light-emitting diode driver 800 illustrated in FIG. 8. However, comparing to the light-emitting diode driver 800, the light-emitting diode driver 1100 further includes an inter-integrated circuit (I²C) interface I2C, a memory unit M1, a set of registers R1 to Rn, an error amplifier EC, a synchronization switch SW2, a digital-to-analog converter (DAC) DAC, a diode Da and a capacitor Ca. The frequency control signal Vfreq may be sent to the memory unit M1 and the set of registers R1 to Rn via the inter-integrated circuit interface I2C so that an outputted frequency control signal Vfreq' may be an n-bit signal. After being processed by the processing unit Fx2, the generated control signal Vsink may include n-bit information accordingly. For example, the control signal Vsink may be a 10-bit digital signal, and the control signal Vsink may be converted to be an analog control signal Vsinka by the digital-to-analog converter DAC. The analog control signal Vsinka is used to control the current sink CS1. Moreover, before the feedback signal Vfb is sent the comparator Comp1, the error amplifier EC may compare the feedback signal Vfb with a reference level Vref for amplifying the feedback signal Vfb to generate a processed feedback signal Vfb' used to be inputted to the comparator Comp1 to set the duty cycle of the pulse-width modulation signal $V_{PWM}$. The diode Da may prevent current backflow. The capacitor Ca may be charged and act as a voltage stabilizer. The synchronization switch SW2 may be controlled by the pulse-width modulation signal $V_{PWM}$ to determine time points for the processed feedback signal Vfb' to be sent to the pulse adjustment signal generator DD2.

Figure 12:
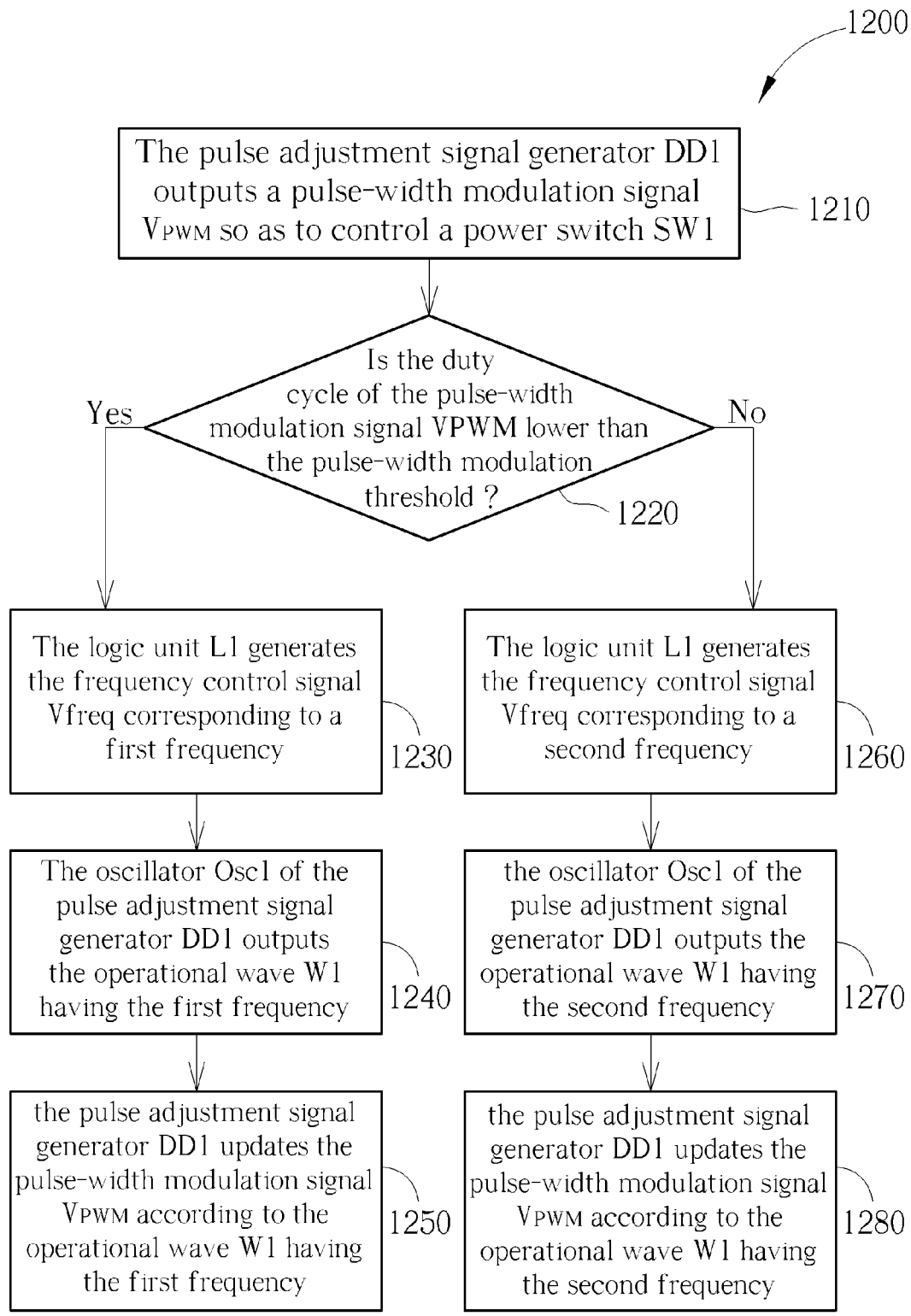
FIG. 12 illustrates a flow chart of a method for controlling a light-emitting diode driver according to an embodiment of the present invention.

FIG. 12 illustrates a flow chart of a method 1200 for controlling a light-emitting diode driver according to an embodiment of the present invention. For example, the method 1200 may be adopted with the light-emitting diode driver 100 shown in FIG. 2. The method 1200 may include following steps.

Step 1210: the pulse adjustment signal generator DD1 outputs a pulse-width modulation signal $V_{PWM}$ so as to control a power switch SW1; go to step 1220;

Step 1220: is the duty cycle of the pulse-width modulation signal $V_{PWM}$ lower than the pulse-width modulation threshold? If yes, go to Step 1230; if no, go to step 1260;

Step 1230: the logic unit L1 generates the frequency control signal Vfreq corresponding to a first frequency; go to step 1240;

Step 1240: the pulse adjustment signal generator DD1 receives the frequency control signal Vfreq corresponding to a second frequency, and the oscillator Osc1 of the pulse adjustment signal generator DD1 outputs the operational wave W1 having the first frequency according to the frequency control signal Vfreq corresponding to the first frequency; go to step 1250;

Step 1250: the pulse adjustment signal generator DD1 updates the pulse-width modulation signal $V_{PWM}$ according to the operational wave W1 having the first frequency; end.

Step 1260: the logic unit L1 generates the frequency control signal Vfreq corresponding to a second frequency; go to step 1270;

Step 1270: the pulse adjustment signal generator DD1 receives the frequency control signal Vfreq corresponding to the second frequency, and the oscillator Osc1 of the pulse adjustment signal generator DD1 outputs the operational wave W1 having the second frequency according to the frequency control signal Vfreq corresponding to the second frequency; go to step 1280;

Step 1280: the pulse adjustment signal generator DD1 updates the pulse-width modulation signal $V_{PWM}$ according to the operational wave W1 having the second frequency; end.

For example, the pulse-width modulation threshold mentioned in the method 1200 may be 50%, and the first frequency may be lower than the second frequency such as setting the first frequency and the second frequency to be 450 KHz and 1.2 MHz separately.

Figure 13:
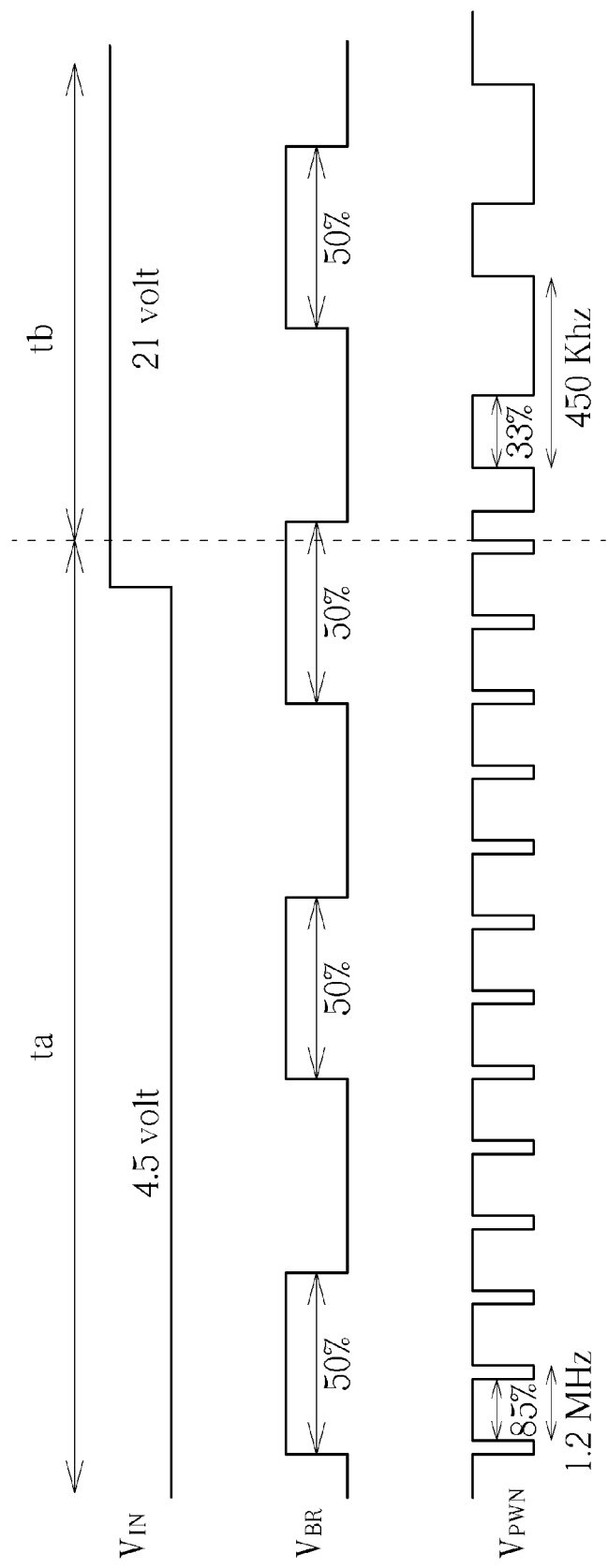
FIG. 13 illustrates signal waveforms corresponding to the method shown in FIG. 12.

FIG. 13 illustrates signal waveforms corresponding to the method 1200 shown in FIG. 12. According to FIG. 13, the duty cycle of the pulse-width modulation signal $V_{PWM}$ is 85% (being higher than the pulse-width modulation threshold 50%) in a duration ta and 33% (being lower than the pulse-width modulation threshold 50%). When the duty cycle of the brightness signal $V_{BR}$ remains 50%, and it enters a duration tb from a duration ta on the timeline, the frequency of the pulse-width modulation signal $V_{PWM}$ is decreased from 1.2 Mhz to 450 Khz. The pulse-width modulation signal $V_{PWM}$ having a duty cycle being not lower than the pulse-width modulation threshold may correspond to an input voltage 4.5 volt (e.g. an input voltage supplied by a battery), and the pulse-width modulation signal $V_{PWM}$ having a duty cycle being lower than the pulse-width modulation threshold may correspond to an input voltage 21 volt (e.g. an input voltage supplied by a transformer).

Figure 14:
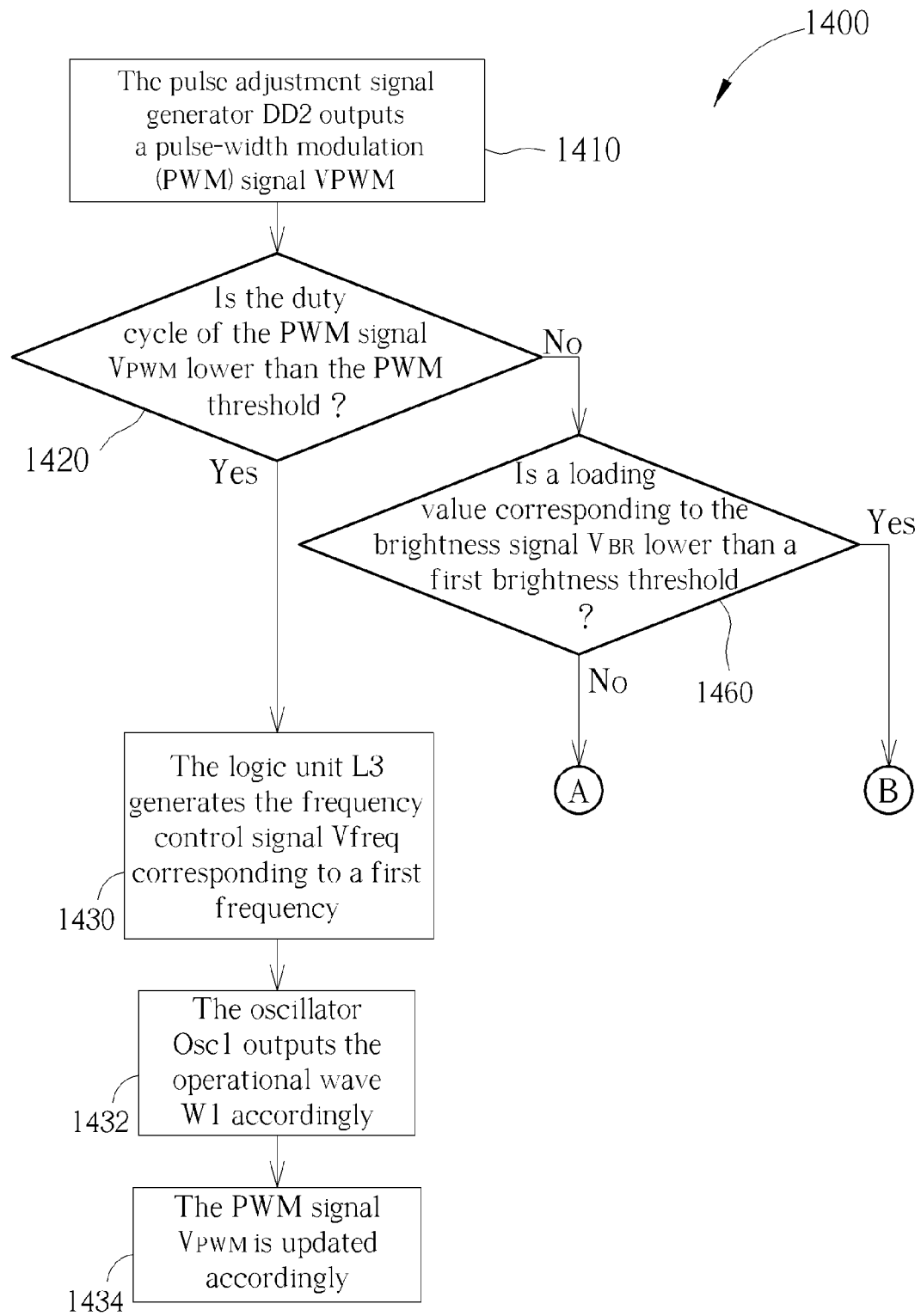
FIGS. 14-15 illustrate a flow chart of a method for controlling a light-emitting diode driver according to an embodiment of the present invention.
Figure 15:
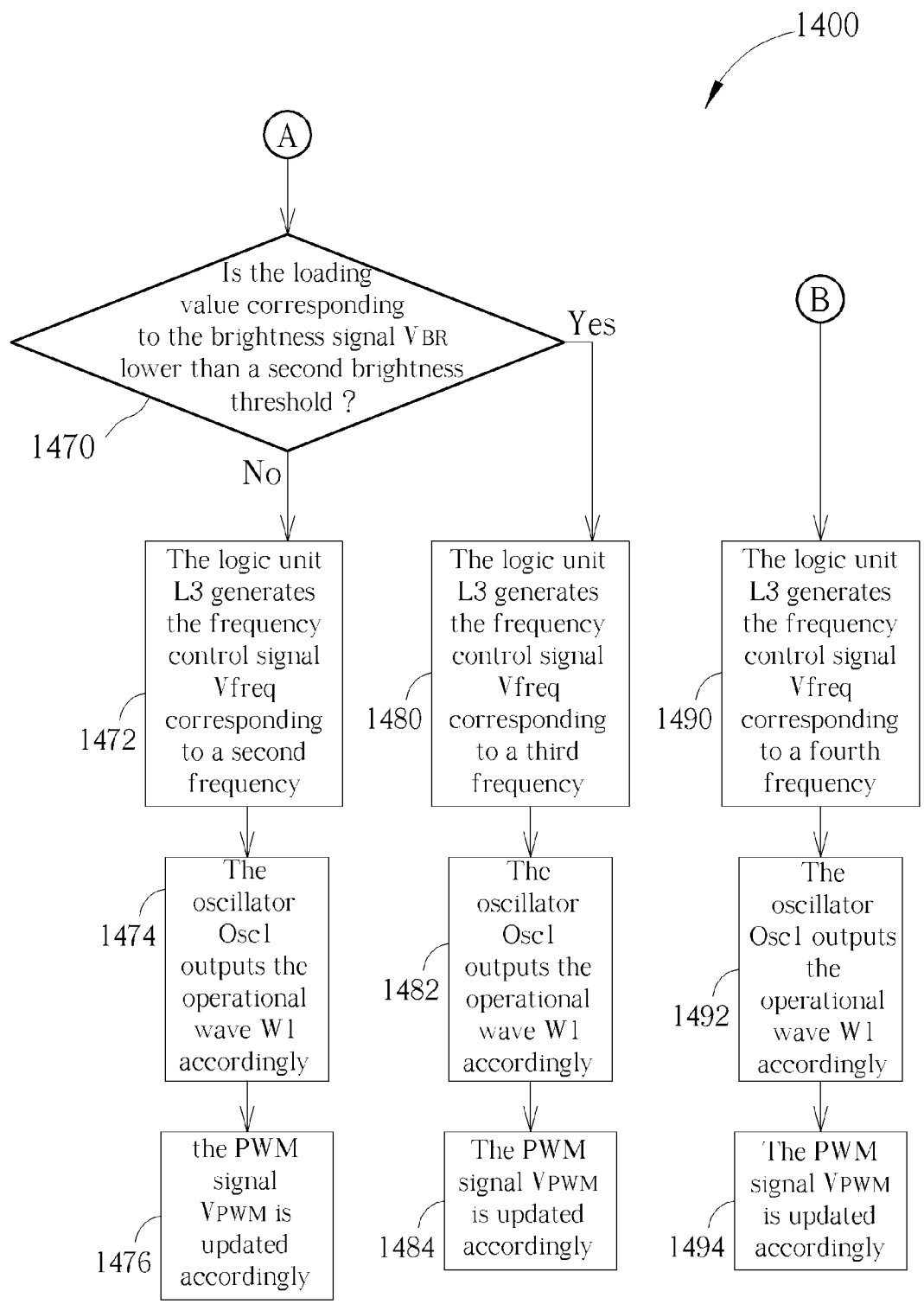

FIGS. 14-15 illustrates a flow chart of a method 1400 for controlling a light-emitting diode driver according to an embodiment of the present invention. For example, the method 1400 may be adopted with the light-emitting diode driver 800 shown in FIG. 8. The method 1400 may include following steps.

Step 1410: the pulse adjustment signal generator DD2 outputs a pulse-width modulation signal $V_{PWM}$ so as to control a power switch SW1; go to step 1420;

Step 1420: is the duty cycle of the pulse-width modulation signal $V_{PWM}$ lower than the pulse-width modulation threshold? If yes, go to Step 1430; if no, go to step 1460;

Step 1430: the logic unit L3 generates the frequency control signal Vfreq corresponding to a first frequency; go to step 1432;

Step 1432: the pulse adjustment signal generator DD2 receives the frequency control signal Vfreq corresponding to a second frequency, and the oscillator Osc1 of the pulse adjustment signal generator DD1 outputs the operational wave W1 having the first frequency according to the frequency control signal Vfreq corresponding to the first frequency; go to step 1434;

Step 1434: the pulse adjustment signal generator DD2 updates the pulse-width modulation signal $V_{PWM}$ according to the operational wave W1 having the first frequency; end.

Step 1460: Is a loading value corresponding to the brightness signal $V_{BR}$ lower than a first brightness threshold? If yes, go to step 1470; If no, go to step 1490;

Step 1470: is the loading value corresponding to the brightness signal $V_{BR}$ lower than a second brightness threshold? If yes, go to step 1472; If no, go to step 1480;

Step 1472: the logic unit L3 generates the frequency control signal Vfreq corresponding to a second frequency; go to step 1474;

Step 1474: the pulse adjustment signal generator DD1 receives the frequency control signal Vfreq corresponding to the second frequency, and the oscillator Osc1 of the pulse adjustment signal generator DD1 outputs the operational wave W1 having the second frequency according to the frequency control signal Vfreq corresponding to the second frequency; go to step 1476;

Step 1476: the pulse adjustment signal generator DD2 updates the pulse-width modulation signal $V_{PWM}$ according to the operational wave W1 having the second frequency; end.

Step 1480: the logic unit L3 generates the frequency control signal Vfreq corresponding to a third frequency; go to step 1482;

Step 1482: the pulse adjustment signal generator DD2 receives the frequency control signal Vfreq corresponding to the third frequency, and the oscillator Osc1 of the pulse adjustment signal generator DD2 outputs the operational wave W1 having the third frequency according to the frequency control signal Vfreq corresponding to the third frequency; go to step 1484;

Step 1484: the pulse adjustment signal generator DD2 updates the pulse-width modulation signal $V_{PWM}$ according to the operational wave W1 having the third frequency; end.

Step 1490: the logic unit L3 generates the frequency control signal Vfreq corresponding to a fourth frequency; go to step 1492;

Step 1492: the pulse adjustment signal generator DD2 receives the frequency control signal Vfreq corresponding to the fourth frequency, and the oscillator Osc1 of the pulse adjustment signal generator DD2 outputs the operational wave W1 having the fourth frequency according to the frequency control signal Vfreq corresponding to the fourth frequency; go to step 1494;

Step 1494: the pulse adjustment signal generator DD2 updates the pulse-width modulation signal $V_{PWM}$ according to the operational wave W1 having the fourth frequency; end.

The first to fourth frequencies mentioned in the method 1400 may be 450 KHz, 600 KHz, 800 KHz and 1.2 MHz exemplarily. The pulse-width modulation threshold may be 50%, the first brightness threshold may correspond to a 70% duty cycle of the brightness signal, and the second brightness threshold may correspond to a 40% duty cycle of the brightness signal. The brightness signal $V_{BR}$ may correspond to a loading value of the light-emitting diode driver. In step 1420, if the duty cycle of the pulse-width modulation signal is lower than the pulse-width modulation threshold, the loading value may correspond to a light load. In step 1460, when the loading corresponding to the brightness signal $V_{BR}$ is not lower than the first brightness threshold, the loading may be a very heavy load. In step 1470, when the loading corresponding to the brightness signal $V_{BR}$ is lower than the second brightness threshold, the loading may be a medium load; and when the loading corresponding to the brightness signal $V_{BR}$ is not lower than the second brightness threshold, the loading may be a heavy load.

Figure 16:
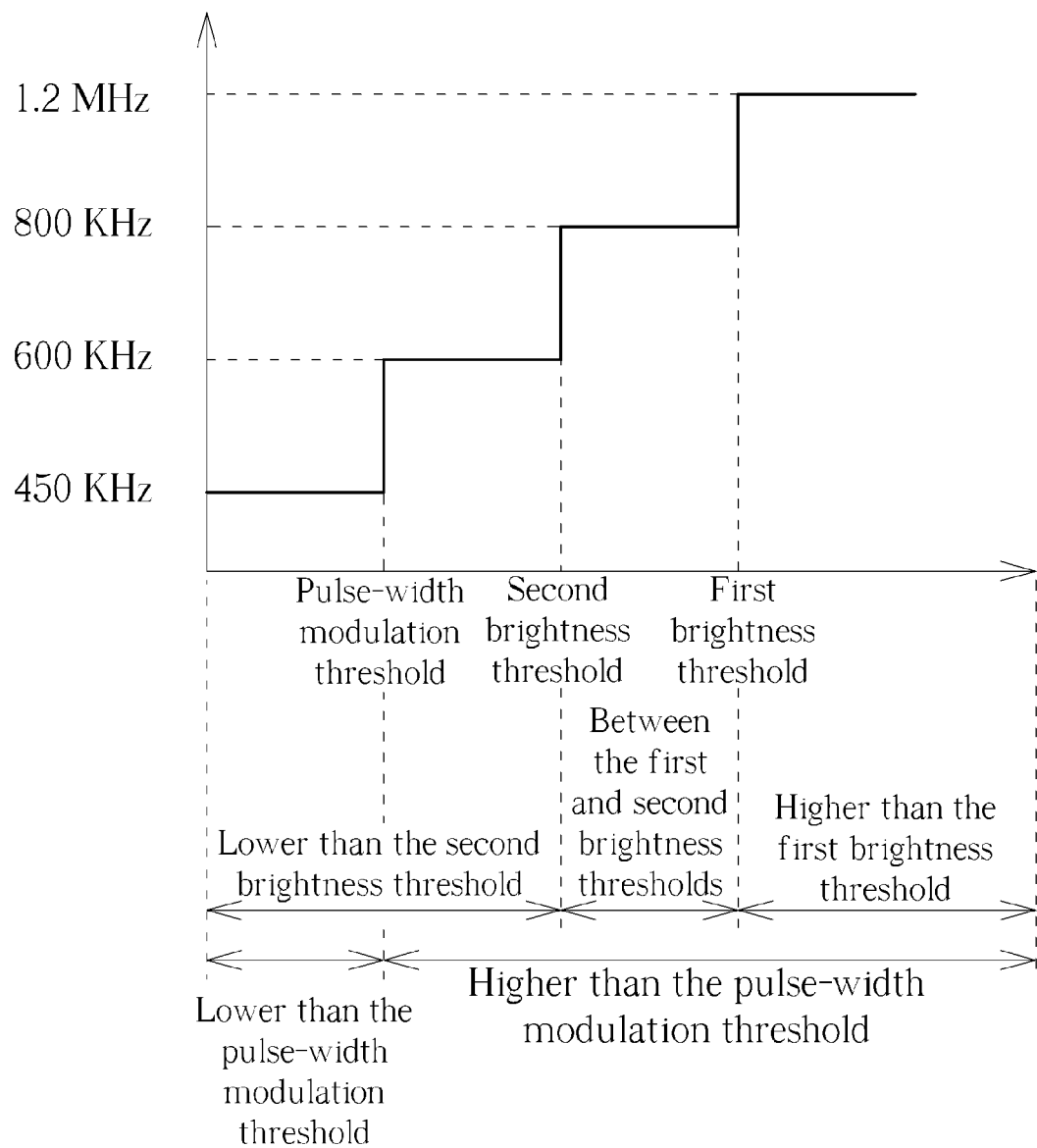
FIG. 16 illustrates a frequency plan for the pulse-width modulation signal $V_{PWM}$ corresponding to the method illustrated by FIGS. 14-15.

FIG. 16 illustrates a frequency plan for the pulse-width modulation signal $V_{PWM}$ corresponding to the method 1400 illustrated by FIGS. 14-15. According to an embodiment, the frequency of the pulse-width modulation signal $V_{PWM}$ may be adjusted according to the duty cycle of the pulse-width modulation signal $V_{PWM}$ and a loading value corresponding to the brightness signal $V_{BR}$. The frequency of pulse-width modulation signal $V_{PWM}$ may be planned to be four frequencies changing stepwise as shown in the line graph of FIG. 16. The four frequencies changing stepwise and shown in FIGS. 14 and 15 are merely taken for example, and a designer may select appropriate values and numbers for the pulse-width modulation threshold(s) and the brightness threshold(s) according to application. The sequence of checking the pulse-width modulation signal $V_{PWM}$ and the brightness signal $V_{BR}$ may be interchangeable. For example, different from the flow chart in FIGS. 14-15, the loading of the brightness signal $V_{BR}$ may be checked in prior to the checking of the duty cycle of the pulse-width modulation signal $V_{PWM}$ for multi-stage frequency adjustment according to another embodiment of the present invention.

Figure 17:
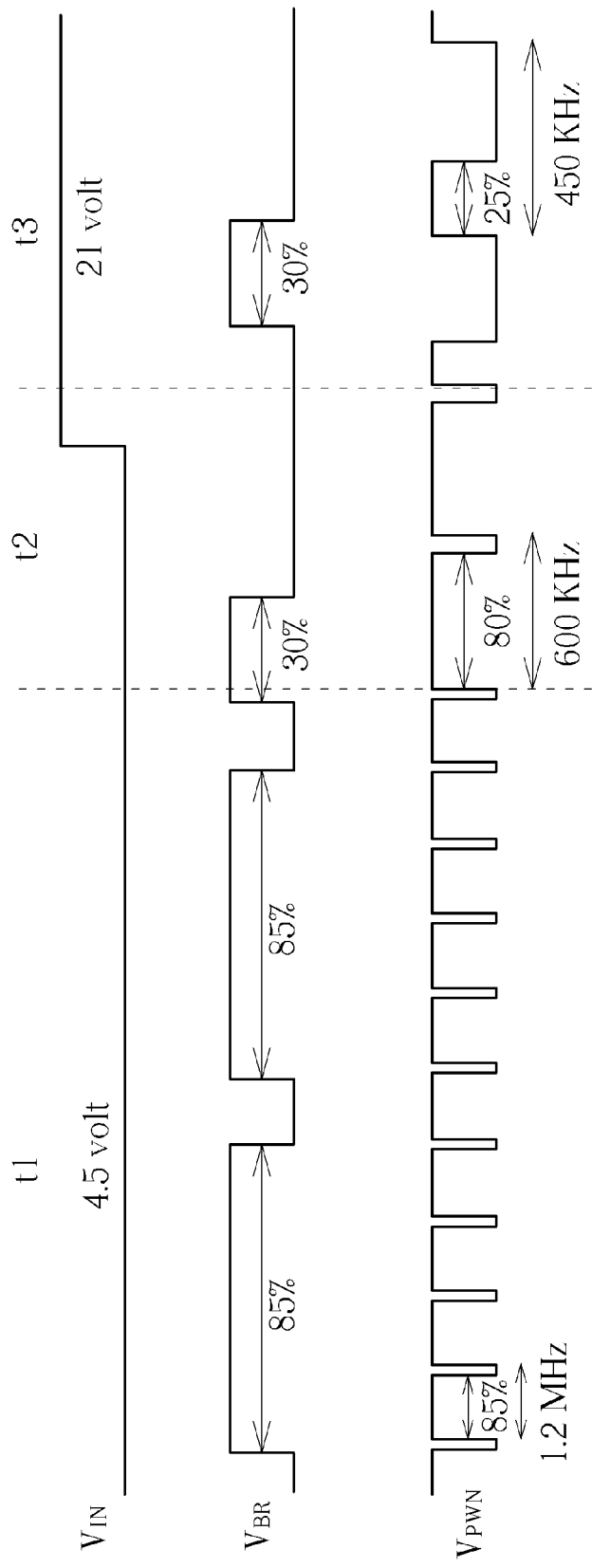
FIG. 17 illustrates signal waveforms corresponding to the method shown in FIGS. 14-15.

FIG. 17 illustrates signal waveforms corresponding to the method 1400 shown in FIGS. 14-15. According to FIG. 17, the duty cycle of the pulse-width modulation signal $V_{PWM}$ is 85% (being higher than the pulse-width modulation threshold such as 50%) in a duration t1 so that the input voltage $V_{IN}$ may correspond to a 4.5 volt input voltage provided by a battery. In the duration t1, the duty cycle of the brightness signal $V_{BR}$ is 50% (being higher than the first brightness threshold such as 70%) so that the brightness signal $V_{BR}$ corresponds to a very heavy load. Hence, the frequency of the pulse-width modulation signal $V_{PWM}$ is set as 1.2 MHz in the duration t1. The duty cycle of the pulse-width modulation signal $V_{PWM}$ is 80% (being higher than the pulse-width modulation threshold such as 50%) in a duration t2 so that the input voltage $V_{IN}$ may correspond to a 4.5 volt input voltage provided by a battery. In the duration t2, the duty cycle of the brightness signal $V_{BR}$ is 30% (being lower than the second brightness threshold such as 40%) so that the brightness signal $V_{BR}$ corresponds to a medium load. Hence, the frequency of the pulse-width modulation signal $V_{PWM}$ is set as 600 KHz in the duration t2. The duty cycle of the pulse-width modulation signal $V_{PWM}$ is 25% (being lower than the pulse-width modulation threshold such as 50%) in a duration t3 so that the input voltage $V_{IN}$ may correspond to a 21 volt input voltage provided by a transformer. In the duration t3, the duty cycle of the brightness signal $V_{BR}$ is 30% (being lower than the second brightness threshold such as 40%) so that the brightness signal $V_{BR}$ corresponds to a light load. Hence, the frequency of the pulse-width modulation signal $V_{PWM}$ is set as 450 KHz in the duration t3.

Figure 18:
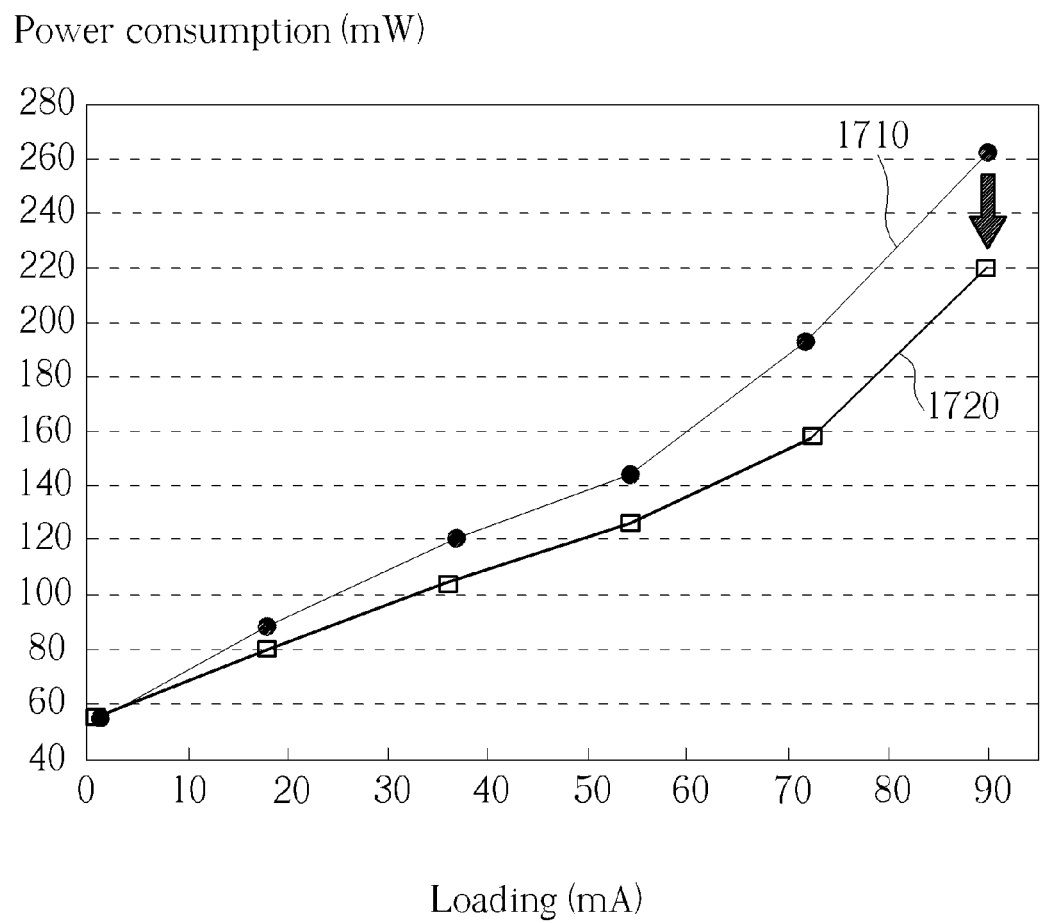
FIG. 18 illustrates a line chart of loading and power consumption according to an embodiment of the present invention.

FIG. 18 illustrates a line chart of loading and power consumption according to an embodiment of the present invention. The horizontal axis represents the loading (corresponding to the brightness signal), and the vertical axis represents the measured power consumption. According to the prior art, when using the pulse-width modulation technique, the frequency of the control signal is not adjustable and is a fixed value (e.g. 1.2 MHz). However, by using the light-emitting diode driver disclosed by the present invention, the frequency of the operational wave may be adjustable when the loading is not a very heavy load. For example, the curve 1720 corresponds to an 450 KHz frequency. As shown in FIG. 18, when the loading is 90 micro-Ampere (mA), the power consumption may be decreased from 264.86 micro-Watt (mW) to 223.29 mW, so 15.69% of power consumption is saved.

Comparing to the prior art, the light-emitting driver and control method disclosed by embodiments of the present invention allow a user to adjust the duty cycle and the frequency of the pulse-width modulation signal $V_{PWM}$ according to the loading value and the input voltage, so the efficiency of driving heavy or light loading is improved, and the performance of reducing the output ripple and noise are better, and the power consumption is decreased. The shortages of the pulse-width modulation technique and the pulse-frequency modulation technique of the prior art are well solved by adopting the present invention, so the present invention should be contributive for the related field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting diode driver comprising:
   a power switch configured to control a charging level of a light-emitting diode voltage terminal, and controlled to be turned on or turned off by a pulse-width modulation signal;

a logic unit coupled to a control terminal of the power switch, and configured to generate a frequency control signal according to a duty cycle of the pulse-width modulation signal; and a pulse adjustment signal generator coupled to the logic unit, and configured to generate an operational wave according to the frequency control signal and update the pulse-width modulation signal according to the operational wave;

wherein the operational wave has a first frequency when the duty cycle of the pulse-width modulation signal is lower than a pulse-width modulation threshold, the operational wave has a second frequency when the duty cycle of the pulse-width modulation signal is not lower than the pulse-width modulation threshold, and the first frequency is lower than the second frequency.

2. The light-emitting diode driver of claim 1, wherein the logic unit comprises:

a clock generator configured to generate a counting wave;

a pulse-width modulation counter configured to generate a pulse-width modulation count value according to the pulse-width modulation signal; and a calculation unit configured to generate the frequency control signal according to the counting wave and the pulse-width modulation count value.

3. The light-emitting diode driver of claim 1, wherein the pulse adjustment signal generator is further configured to adjust the duty cycle of the pulse-width modulation signal according to a feedback signal, and generate a control signal according to the pulse-width modulation signal and a brightness signal;

the light-emitting diode driver further comprises a current sink having an operational voltage, and the current sink is configured to generate an adjustment signal according to the control signal to control display brightness of a backlight panel, and generate the feedback signal according to the operational voltage.

4. The light-emitting diode driver of claim 1, wherein the pulse adjustment signal generator comprises:

an oscillator configured to output the operational wave according to the frequency control signal;

a comparator coupled to the oscillator and configured to generate the pulse-width modulation signal according to the operational wave and a feedback signal;

a latch coupled to the oscillator and the comparator, and configured to control whether the pulse-width modulation signal is output according to the operational wave; and a driving unit coupled to the latch, and configured to output the pulse-width modulation signal to the power switch.

5. A light-emitting diode driver comprising:

a power switch configured to control a charging level of a light-emitting diode voltage terminal, and controlled to be turned on or turned off by a pulse-width modulation signal;

a logic unit configured to generate a frequency control signal according to a brightness signal; and a pulse adjustment signal generator coupled to the logic unit, and configured to generate an operational wave according to the frequency control signal and update the pulse-width modulation signal according to the operational wave;

wherein the operational wave has a first frequency when a loading value corresponding to the brightness signal is lower than a brightness threshold, the operational wave has a second frequency when the loading value corresponding to the brightness signal is not lower than the brightness threshold, and the first frequency is lower than the second frequency.

6. The light-emitting diode driver of claim 5, where in the logic unit comprises:

a clock generator configured to generate a counting wave;

a brightness signal counter configured to generate a brightness count value according to the brightness signal; and a calculation unit configured to generate the frequency control signal according to the counting wave and the brightness count value.

7. The light-emitting diode driver of claim 5, wherein the pulse adjustment signal generator is further configured to update the duty cycle of the pulse-width modulation signal according a feedback signal, and generate a control signal according to the duty cycle of the pulse-width modulation signal and the brightness signal;

the light-emitting diode driver further comprises a current sink having an operational voltage, and the current sink is configured to generate an adjustment signal according to the control signal to control display brightness of a backlight panel, and generate the feedback signal according to the operational voltage.

8. The light-emitting diode driver of claim 5, wherein the pulse adjustment signal generator comprises:

an oscillator configured to output the operational wave according to the frequency control signal;

a comparator coupled to the oscillator and configured to generate the pulse-width modulation signal according to the operational wave and a feedback signal;

a latch coupled to the oscillator and the comparator, and configured to control whether the pulse-width modulation signal is output according to the operational wave; and a driving unit coupled to the latch, and configured to output the pulse-width modulation signal to the power switch.

9. A light-emitting diode driver comprising:

a power switch configured to control a charging level of a light-emitting diode voltage terminal, and controlled to be turned on or turned off by a pulse-width modulation signal;

a logic unit coupled to a control terminal of the power switch, and configured to generate a frequency control signal according to a duty cycle of the pulse-width modulation signal and a brightness signal; and a pulse adjustment signal generator coupled to the logic unit, and configured to generate an operational wave according to the frequency control signal and update the pulse-width modulation signal according to the operational wave;

wherein the operational wave has a first frequency when the duty cycle of the pulse-width modulation signal is lower than a pulse-width modulation threshold, the operational wave has a second frequency when the duty cycle of the pulse-width modulation signal is not smaller than a pulse-width modulation threshold, and the first frequency is lower than the second frequency.

10. The light-emitting diode driver of claim 9, wherein the logic unit comprises:

a clock generator configured to generate a counting wave;

a pulse-width modulation counter configured to generate a pulse-width modulation count value according to the pulse-width modulation signal;

a brightness signal counter configured to generate a brightness count value according to the brightness signal; and a calculation unit configured to generate the frequency control signal according to the counting wave, the pulse-width modulation count value and the brightness count value.

11. The light-emitting diode driver of claim 9, wherein the pulse adjustment signal generator is further configured to update the duty cycle of the pulse-width modulation signal according to a feedback signal, and generate a control signal according to the duty cycle of the pulse-width modulation signal and the brightness signal;

the light-emitting diode driver further comprises a current sink having an operational voltage, and the current sink is configured to generate an adjustment signal according to the control signal to control display brightness of a backlight panel, and generate the feedback signal according to the operational voltage.

12. The light-emitting diode driver of claim 9, wherein the pulse adjustment signal generator comprises:

an oscillator configured to output the operational wave according to the frequency control signal;

a comparator coupled to the oscillator and configured to generate the pulse-width modulation signal according to the operational wave and a feedback signal;

a latch coupled to the oscillator and the comparator, and configured to control whether the pulse-width modulation signal is output according to the operational wave; and a driving unit coupled to the latch, and configured to output the pulse-width modulation signal to the power switch.

13. A method for controlling a light-emitting diode driver, the light-emitting diode driver comprising a logic unit and a pulse adjustment signal generator, the method comprising:

the pulse adjustment signal generator outputting a pulse-width modulation signal so as to control a power switch;

the logic unit generating a frequency control signal according to a duty cycle of the pulse-width modulation signal;

the pulse adjustment signal generator receiving the frequency control signal, and an oscillator of the pulse adjustment signal generator outputting an operational wave according to the frequency control signal; and the pulse adjustment signal generator updating the pulse-width modulation signal according to the operational wave.

14. The method of claim 13, wherein the operational wave has a first frequency when the duty cycle is lower than a pulse-width modulation threshold; the operational wave has a second frequency when the duty cycle is not smaller than the pulse-width modulation threshold; and the first frequency is lower than the second frequency.

15. A method for controlling a light-emitting diode driver, the light-emitting diode driver comprising a logic unit and a pulse adjustment signal generator, the method comprising:

the pulse adjustment signal generator outputting a pulse-width modulation signal to control a power switch;

the logic unit generating a frequency control signal according to a duty cycle of the pulse-width modulation signal and a brightness signal;

the pulse adjustment signal generator receiving the frequency control signal, and an oscillator of the pulse adjustment signal generator outputting an operational wave according to the frequency control signal; and the pulse adjustment signal generator updating the pulse-width modulation signal according to the operational wave.

16. The method of claim 15, wherein the operational wave has a first frequency when the duty cycle is lower than a pulse-width modulation threshold; the operational wave has a second frequency when the duty cycle is not smaller than the pulse-width modulation threshold; and the first frequency is lower than the second frequency.

17. A method for controlling a light-emitting diode driver, the light-emitting diode driver comprising a logic unit and a pulse adjustment signal generator, the method comprising:

the pulse adjustment signal generator outputting a pulse-width modulation signal to control a power switch;

the logic unit generating a frequency control signal according to a brightness signal;

the pulse adjustment signal generator receiving the frequency control signal, and an oscillator of the pulse adjustment signal generator outputting an operational wave according to the frequency control signal; and the pulse adjustment signal generator updating the pulse-width modulation signal according to the operational wave.

18. The method of claim 17, wherein the operational wave has a first frequency when a loading value corresponding to the brightness signal is lower than a brightness threshold, the operational wave has a second frequency when the loading value corresponding to the brightness signal is not lower than the brightness threshold, and the first frequency is lower than the second frequency.

* * * * *